United States Patent
Yokosawa et al.

(10) Patent No.: US 9,532,250 B2
(45) Date of Patent: Dec. 27, 2016

(54) COMMUNICATION MONITORING SYSTEM, COMMUNICATION MONITORING METHOD, AND COMMUNICATION MONITORING DEVICE

(71) Applicant: FUJITSU LIMITED, Kawasaki-shi, Kanagawa (JP)

(72) Inventors: Yukiko Yokosawa, Kawasaki (JP); Rie Nagatsu, Kawasaki (JP); Norio Murakami, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/055,316

(22) Filed: Feb. 26, 2016

(65) Prior Publication Data

US 2016/0255524 A1 Sep. 1, 2016

(30) Foreign Application Priority Data

Feb. 27, 2015 (JP) ................................ 2015-038076

(51) Int. Cl.
*H04W 28/10* (2009.01)
*H04W 24/08* (2009.01)

(52) U.S. Cl.
CPC .................... *H04W 24/08* (2013.01)

(58) Field of Classification Search
CPC ...... H04W 16/10; H04W 16/32; H04W 24/08; H04W 92/20; H04W 92/045; H04W 84/045; H04W 84/047; H04W 72/24; H04W 72/0486; H04W 72/0433; H04W 28/10; H04W 28/08; H04L 12/28
See application file for complete search history.

(56) References Cited

U.S. PATENT DOCUMENTS

| 8,620,301 | B1* | 12/2013 | Hessel | H04W 16/18 455/277.2 |
|---|---|---|---|---|
| 2008/0004037 | A1* | 1/2008 | Achlioptas | H04W 24/02 455/456.1 |
| 2010/0254344 | A1 | 10/2010 | Wei et al. | |
| 2011/0188403 | A1 | 8/2011 | Calippe et al. | |
| 2012/0295609 | A1* | 11/2012 | Li | H04W 24/04 455/423 |

(Continued)

FOREIGN PATENT DOCUMENTS

| JP | 2012-523186 A | 9/2012 |
|---|---|---|
| JP | 2013-518521 A | 5/2013 |
| JP | 2014-504838 A | 2/2014 |

*Primary Examiner* — Thanh Le
(74) *Attorney, Agent, or Firm* — Arent Fox LLP

(57) ABSTRACT

A communication monitoring system including: a first base station device having a first service area, a second base station device having a second service area being included in the first service area and smaller than the first service area, a terminal device configured to perform a first radio communication with the first base station device when the terminal device is located in the first service area, and a second radio communication with the second base station device when the terminal device is located in the second service area, and a monitoring device configured to: receive first observation data acquired from the first radio communication, receive second observation data acquired from the second radio communication, and estimate a cause for the first observation data and the second observation data being obtained, based on the first observation data and the second observation data.

12 Claims, 19 Drawing Sheets

(56) References Cited

U.S. PATENT DOCUMENTS

2013/0310052 A1     11/2013   Timus et al.
2013/0329562 A1 *   12/2013   Murakami ............ H04W 24/08
                                                            370/241
2015/0289225 A1 *   10/2015   Gao ...................... H04W 64/00
                                                            455/456.5

* cited by examiner

FIG. 14

| |
|---|
| Decrease of connection success rate of RRC connection phase (total of incoming/outgoing of all kinds) |
| Decrease of connection success rate of RAB establishment phase (total of all RAB) |
| Decrease of connection success rate (total of all RAB) of multiRAB ($2^{nd}$ RAB or higher) |
| High RRC connection reject rate (total of incoming/outgoing of all kinds) |
| Low RRC connection setup transmission rate (total of incoming/outgoing of all kinds) |
| Low RRC connection setup completion rate (total of incoming/outgoing of all kinds) |
| Low CS-total connection success rate of RAB establishment phase |
| Low PS-total connection success rate of RAB establishment phase |
| Low connection success rate of RRC connection phase (total of conversation incoming/outgoing) |
| Low connection success rate of RRC connection phase (total of streaming incoming/outgoing) |
| High RAB connection failure rate of Radio Link reconfigure failure with cause UL (AMR) |
| High RAB connection failure rate of Radio Link reconfigure failure with cause DL (AMR) |
| High failure rate of RAB reject with cause of unspecific (CS) |
| High failure rate of RAB reject with cause of resource (CS) |

FIG. 15

| Own Cell Traffic | High | High | High | High | Low | Low | Low | High | High | High | ... | ... |
|---|---|---|---|---|---|---|---|---|---|---|---|---|
| Other Cell Traffic | High | Low | High | Low | High | Low | Low | High | Low | High | ... | ... |
| Call Drop | Low | Low | High | High | Low | Low | High | Low | Low | High | ... | ... |
| Other Cell RL-F | High | High | High | High | High | High | High | Low | Low | Low | ... | ... |
| Trouble Cause | 1 | 3 | 2 | 4 | 5 | 5 | 6 | 6 | 1 | 3 | 2 | ... |

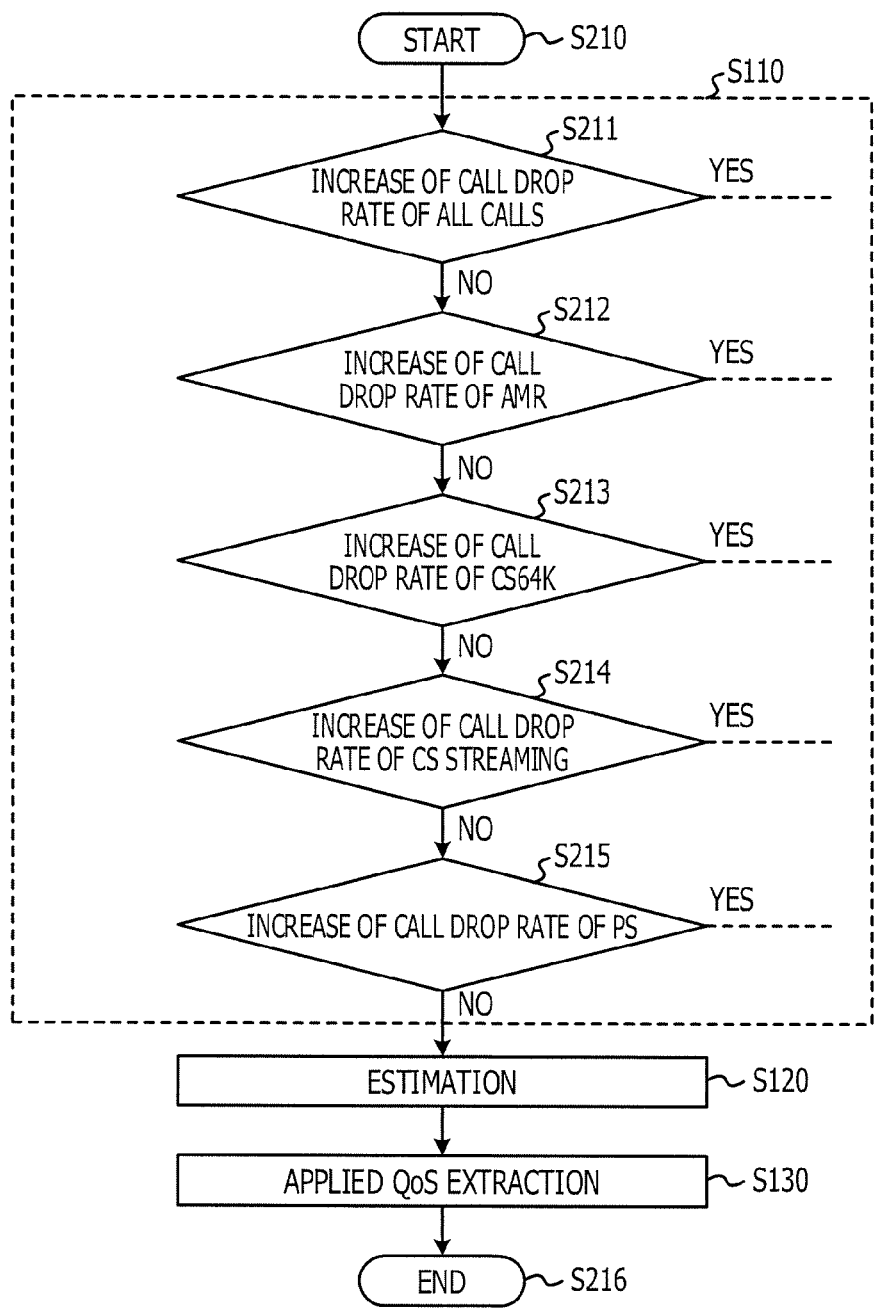

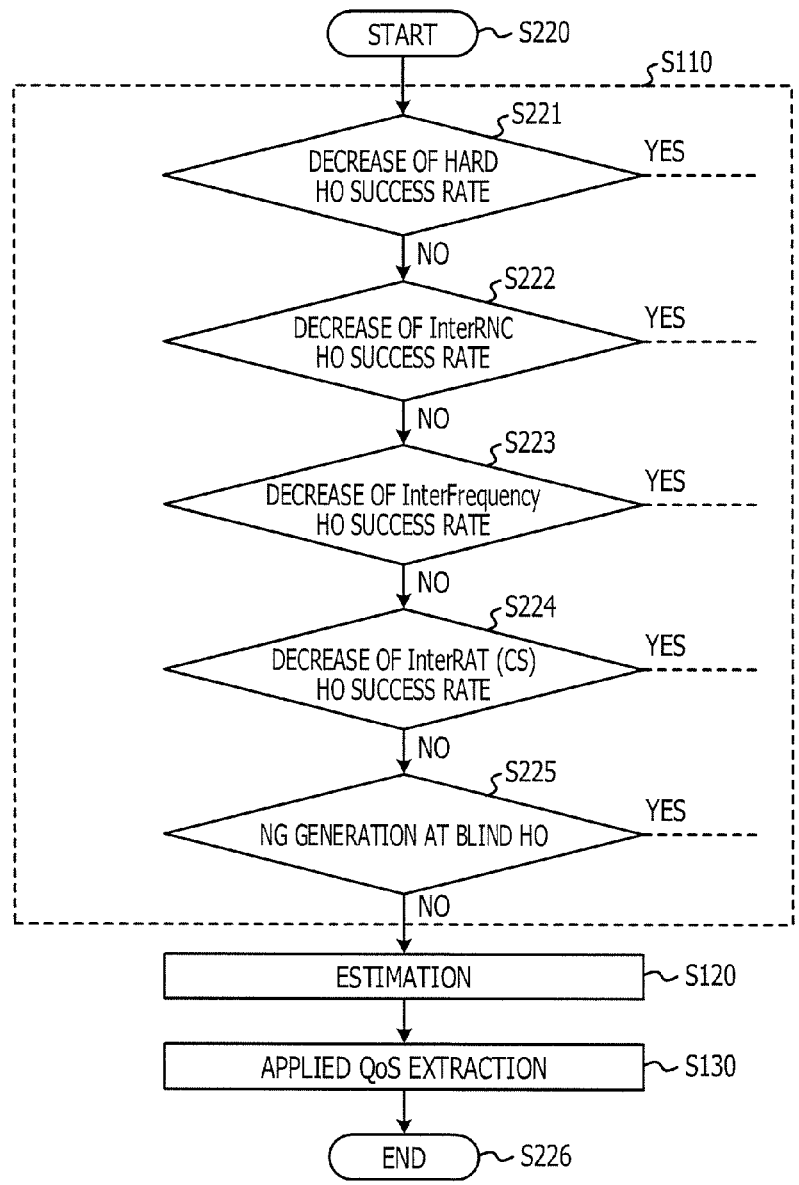

FIG. 18

| | |
|---|---|
| Increase of Call Drop Rate | Increase of total call drop rate of all services |
| | Increase of CS total call drop rate |
| | Increase of PS total call drop rate |
| | Increase of CS call drop radio link failure |
| | Increase of PS call drop radio link failure (DCH) |
| | Increase of PS call drop radio link failure (FACH) |
| | Increase of CS streaming call drop radio link failure |
| | ⋮ |
| | ⋮ |
| | Drop generated irrespective of services? |
| | Generated at a specific rate? |
| | Generated at a specific cell? |
| | Generated continuously? |
| | Generate for a specific UE? |
| | ⋮ |
| | ⋮ |
| Decrease of Handover Success Rate | Decrease of success rate in HHO preparation phase |
| | Decrease of success rate in HHO execution phase |
| | Decrease of success rate of Inter frequency HHO (blind HO) (total of all services) |
| | Decrease of success rate of Inter frequency HHO (blind HO) (CS streaming) |
| | ⋮ |
| | ⋮ |
| | Decrease of radio HO to GSM (event 3a) of execution phase of inter RAT HHO (total of all services) |
| | Decrease of blind HO to GSM (event 2d_em) of execution phase of inter RAT HHO (CS streaming) |

# COMMUNICATION MONITORING SYSTEM, COMMUNICATION MONITORING METHOD, AND COMMUNICATION MONITORING DEVICE

CROSS-REFERENCE TO RELATED APPLICATION

This application is based upon and claims the benefit of priority of the prior Japanese Patent Application No. 2015-038076, filed on Feb. 27, 2015, the entire contents of which are incorporated herein by reference.

FIELD

The embodiments discussed herein are related to a communication monitoring system.

BACKGROUND

Communication systems such as a mobile phone system and a wireless local area network (LAN) are widely used nowadays. In the field of radio communication, the next-generation communication technique to further increase the speed and capacity of communications has been discussed. For example, the 3rd generation partnership project (3GPP) as a standards body has completed or discussed the standardization of a communication standard called the long term evolution (LTE) and an LTE-based communication standard called LTE-Advanced (LTE-A).

At Such a communication system, mobile terminals move from moment to moment, and communication environment changes from moment to moment. A large amount of observation data may be obtained in accordance with such movement and change. Examples of such observation data include the connection rate of a mobile terminal to a base station and the transmission power of a radio signal from a base station to a mobile terminal. Such observation data changes as time passes.

An operating and maintenance (O&M) system is focused on as a communication monitoring system that monitors a service state of a communication system. For example, in the O&M system, observation data is collected, and processing is performed on the observation data. As a result of the processing, for example, an observation result and an analysis result of the observation data are obtained. The operator or observer of the communication monitoring system may find a trouble such as congestion occurring in the communication system based on, for example, the observation result and the analysis result displayed on a monitor screen of the O&M system, and perform various kinds of handling methods.

Meanwhile, a heterogeneous network (HetNet) is focused on as a technique related to a communication system. The HetNet is a technique of hierarchically configuring systems having, for example, different cell radii and radio communication schemes in an identical service area. This technique may improve the capacity of the whole communication system as compared to, for example, a communication system (hereinafter, referred to as a non-HetNet) other than the HetNet.

Examples of a technique related to the communication monitoring system include the following techniques.

Specifically, there is a technique related to a method and an apparatus for analyzing distribution of a mobile service, the technique including: determining part of connection for transferring data between network elements based on configuration information, state information, and connection information of a network, and storing the part in a storage medium.

According to this technique, an operator may be assisted in executing some tasks and other tasks may be automatically executed when possible.

In addition, there is a technique related to a dynamic resource transaction (DRT) method, in which a base station sends an interference measurement result to a self-organized network (SON) server, the SON server returns a DRT produced based on an interference result to the base station, and the base station executes the DRT.

According to this technique, the interference and frequent handover of a fast mobile station may be avoided.

In addition, there is a technique related to a radio base station, in the technique, one of first and second backhaul paths being selected based on a capacity available on the second backhaul path.

According to this technique, an improved method and apparatus that support backhaul selection in a radio communication system may be provided.

The related techniques are disclosed in, for example, Japanese National Publication of International Patent Application Nos. 2013-518521, 2012-523186, and 2014-504838.

SUMMARY

According to an aspect of the invention, a communication monitoring system including: a first base station device having a first service area, a second base station device having a second service area being included in the first service area and smaller than the first service area, a terminal device configured to perform a first radio communication with the first base station device when the terminal device is located in the first service area, and a second radio communication with the second base station device when the terminal device is located in the second service area, and a monitoring device configured to: receive first observation data acquired from the first radio communication, from the first base station device, receive second observation data acquired from the second radio communication, from the second base station device, and estimate a cause for the first observation data and the second observation data being obtained, based on the first observation data and the second observation data.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 14 is an event list used in an observation event analysis for an example with the decrease of the call connection rate;

FIG. 15 is a matrix diagram of an exemplary prediction (estimation);

FIG. 16 is a flowchart for an example with an increase of a call drop rate;

FIG. 17 is a flowchart for an example with a decrease of a handover success rate;

FIG. 18 is an event list used in the observation event analysis for an example with the increase of the call drop rate and the decrease of the handover success rate.

DESCRIPTION OF EMBODIMENTS

For example, observation data such as a connection rate and a call drop rate (or call loss rate) of a mobile terminal to a base station exists not only for a macro cell but also for a small cell in a HetNet communication system. Thus, an increased amount of observation data is handled in the HetNet communication system than in a non-HetNet communication system.

An operator or observer that operates a communication monitoring system desirably has skills to make a comprehensive determination, including a handling method, on observation results and analysis results. However, since an increased amount of observation data is handled in HetNet communication system as compared to the non-HetNet communication system, a large amount of observation results and analysis results are obtained in the O&M system, which increases a work burden on the operator or observer.

As described above, a large amount of observation data is generated in the HetNet communication system as compared to the non-HetNet communication system, and the O&M system performs processing on such a large amount of observation data. In this case, the O&M system takes time to obtain analysis results and the like from observation results. Since observation data changes from moment to moment as described above, taking time to obtain analysis results from observation results makes it difficult for the communication monitoring system to select a handling method appropriate for a change in the state and quality of communications, and thus it is difficult to maintain a stable communication service.

The above-described technique of determining part of connection to transfer data based on configuration information and the like of a network determines part of connection, and does not disclose how to handle a large amount of observation data.

Moreover, the above-described techniques of producing a DRT in a SON server and of selecting the first or second backhaul path do not indicate how to handle a large amount of observation data.

Therefore, with any of the above-described techniques, it is difficult to reduce a work burden, due to generation of a large amount of observation data, on the operator or observer. Moreover, with any of the above-described techniques, an instantaneous handling method in accordance with a change of a communication system is not selected, and it is difficult to maintain a stable communication system.

Thus, one disclosure provides a communication monitoring system in which a work burden on an operator or observer that operates a communication monitoring system is reduced.

Another disclosure provides a communication monitoring system in which a stable communication system is maintained.

Hereinafter, embodiments of the present disclosure will be described.

First Embodiment

Figure 1:
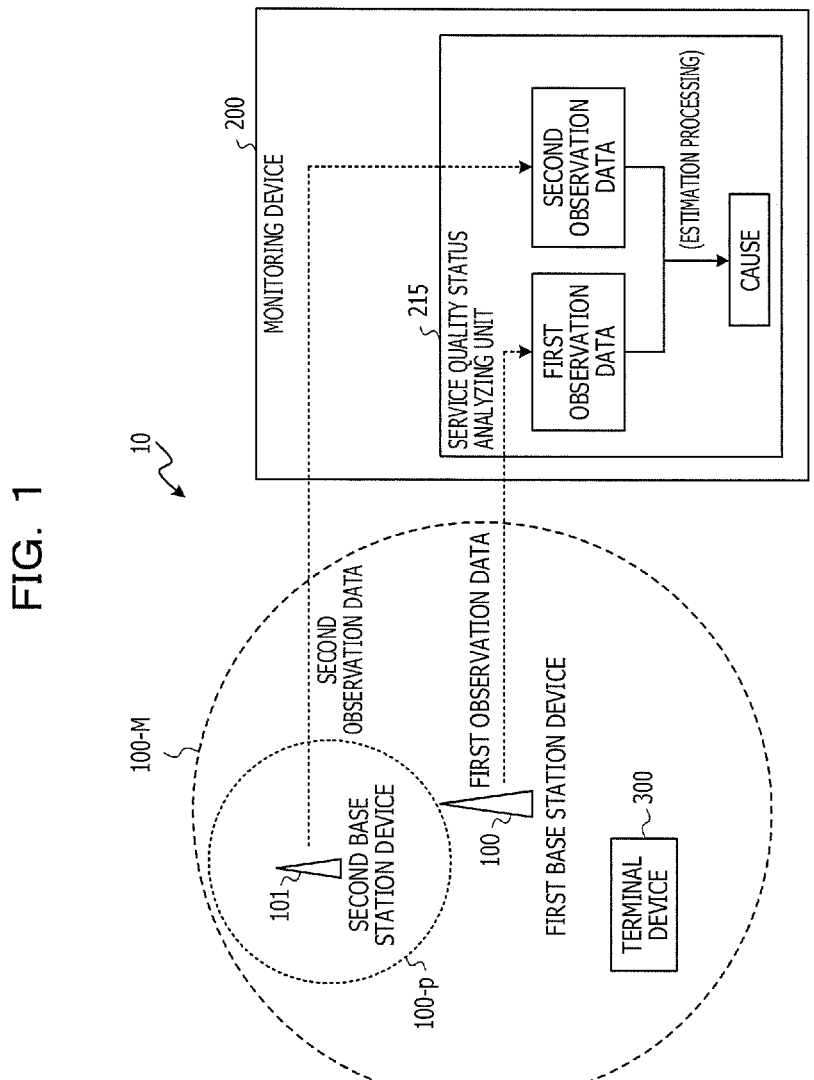
FIG. 1 illustrates an exemplary configuration of a communication monitoring system.

FIG. 1 illustrates an exemplary configuration of a communication monitoring system 10 according to a first embodiment. The communication monitoring system 10 includes a first base station device 100, a second base station device 101, a monitoring device 200, and a terminal device 300.

The first base station device 100 forms a first service area 100-M. The second base station device 101 forms a second service area 100-P. The second service area 100-P is included in the first service area 100-M, and is smaller than the first service area 100-M.

The first base station device 100 performs a radio communication with the terminal device 300 when the terminal device 300 is located in the first service area 100-M. The first base station device 100 acquires first observation data when performing the radio communication with the terminal device 300. The first base station device 100 transmits the first observation data to the monitoring device 200.

The second base station device 101 performs a radio communication with the terminal device 300 when the terminal device 300 is located in the second service area 100-P. The second base station device 101 acquires second observation data when performing the radio communication with the terminal device 300. The second base station device 101 transmits the second observation data to the monitoring device 200.

The monitoring device 200 includes a service quality status analyzing unit 215.

The service quality status analyzing unit 215 estimates a cause for the first and the second observation data being obtained, based on the first and the second observation data received from the first and second base station devices 100 and 101.

In this manner, the monitoring device 200 uses the observation data obtained by the first and second base station devices 100 and 101 so as to, for example, estimate a cause of a change in a communication quality and a service state, which is indicated by observation data. Such an estimation takes into account not only the state of the base station device itself but also, for example, the state of a neighboring base station device, thereby enabling the estimation of a cause for the observation data being obtained in a HetNet configuration. Displaying a result of this estimation on, for example, a monitor used by an operator of the communication monitoring system 10 reduces a work burden on the operator of the communication monitoring system 10, thereby maintaining a stable communication system without relying on the skill of the operator.

Second Embodiment

The following describes a second embodiment.
<Exemplary Configuration of Communication Monitoring System>

An exemplary configuration of the communication monitoring system 10 will be described first. Note that the communication monitoring system 10 is an exemplary communication monitoring system. The communication monitoring system 10 collects observation data from, for example, a base station device that performs a radio communication, and notifies an estimated trouble cause to an operator or observer that operates the communication monitoring system 10 and the like.

Figure 2:
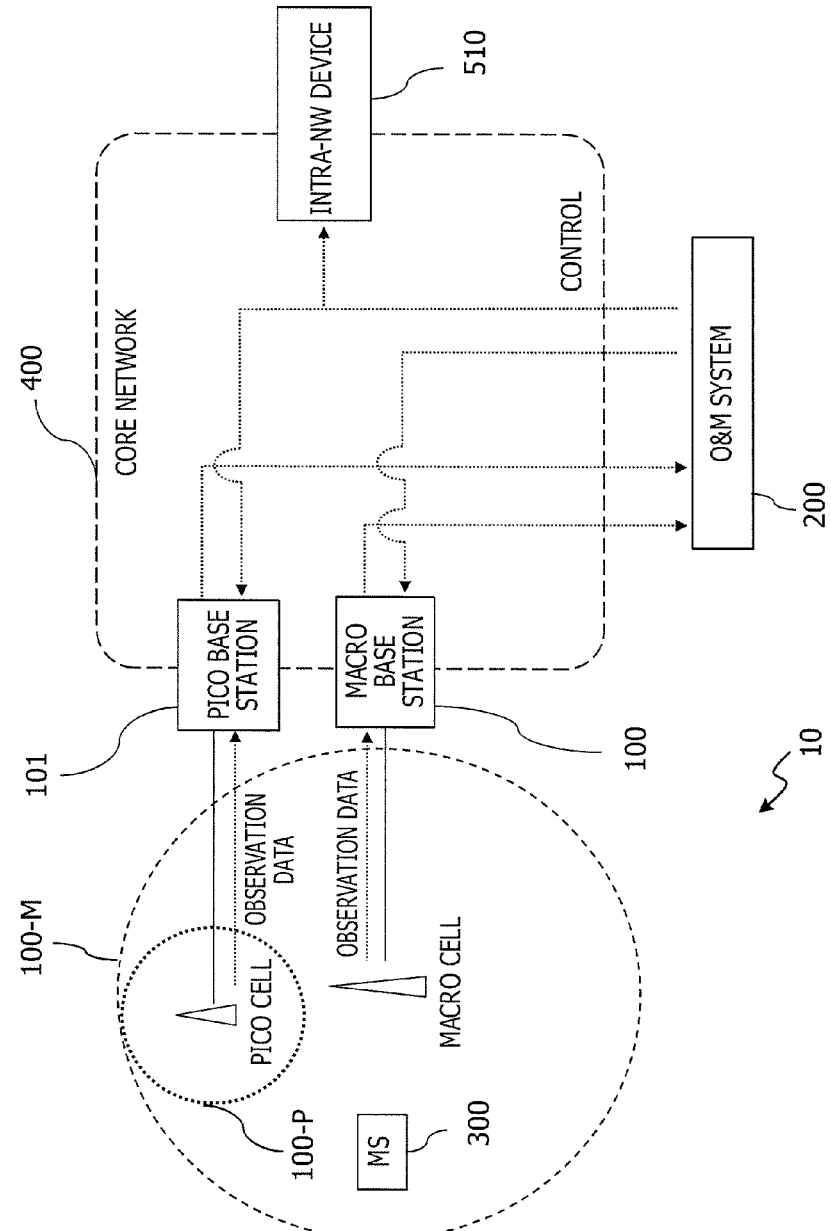
FIG. 2 illustrates an exemplary configuration of the communication monitoring system.

FIG. 2 illustrates an exemplary configuration of the communication monitoring system 10 according to the second embodiment. The communication monitoring system 10 includes base stations 100 and 101, an operating and maintenance (O&M) system 200, a mobile station (MS) 300, a core network 400, and an intra-network (NW) device 510.

Each of the base stations 100 and 101 is a radio communication device that performs a radio communication with the MS 300 located in its own service area. Each of the base stations 100 and 101 collects various observation data during the radio communication with the MS 300. The base station 100 corresponds to, for example, the first base station device 100 in the first embodiment. The base station 101 corresponds to, for example, the second base station device 101 in the first embodiment.

The O&M system 200 collects, from the base stations 100 and 101, for example, various observation data obtained by the base stations 100 and 101 and predicts (or estimates; hereinafter, collectively referred to as "estimates") a trouble cause unobserved from current observation data. The details of the estimation will be described later. In the O&M system 200, an unobserved trouble cause is estimated and, for example, an estimated trouble cause is displayed on a monitor screen, which allows an operator of the O&M system 200 to take various actions in accordance with this estimated trouble cause. The O&M system 200 corresponds to, for example, the monitoring device 200 in the first embodiment.

The MS 300 is a radio communication device that performs radio communications with, for example, the base stations 100 and 101. Examples of the MS 300 include terminal devices such as a smartphone and a feature phone. The MS 300 may receive various services such as a call service through radio communications with the base stations 100 and 101 in the service areas of the base stations 100 and 101. The communication monitoring system 10 illustrated in FIG. 2 has a single MS 300 as an example, but may have a plurality of MS 300.

The MS 300 corresponds to, for example, the terminal device 300 in the first embodiment.

The core network 400 is a network to which, for example, the base stations 100 and 101 are connected. In addition to the base stations 100 and 101, intra-network devices such as a mobility management entity (MME) and a serving-gateway (S-GW) may be connected to the core network 400. For example, the MME performs a control on communication for the base stations 100 and 101, such as setting of data transfer paths between the S-GW and the base stations 100 and 101. The S-GW relays transmitted and received data, such as performing an interface matching on data transmitted and received between the core network 400 and another network.

The intra-NW device 510 is, for example, the MME or the S-GW described above.

<Flow of Observation Data in Communication Monitoring System>

The flow of observation data in the communication monitoring system 10 will be described with reference to FIG. 2 below.

As illustrated in FIG. 2, a macro base station 100 forms the first service area 100-M. A pico base station 101 forms the second service area 100-P. The service area 100-M of the macro base station 100 includes the service area 100-P of the pico base station 101, and the two service areas 100-M and 100-P are hierarchically arranged. A communication system in which such two service areas 100-M and 100-P are thus hierarchically arranged is referred to as a HetNet, for example.

The base station 100 forming the first service area 100-M as illustrated in FIG. 2 may be referred to as the macro base station 100. On the other hand, the base station 101 forming the second service area 100-P may be referred to as the pico base station 101.

Moreover, the macro base station 100 and the first service area 100-M may be collectively referred to as a macro cell. On the other hand, the pico base station 101 and the second service area 100-P may be collectively referred to as a pico cell.

The macro base station 100 obtains observation data when performing a radio communication with the MS 300 located in the service area 100-M. The pico base station 101 also obtains observation data when performing a radio communication with the MS 300 located in the second service area 100-P. The macro base station 100 and the pico base station 101 transmit the obtained observation data to the O&M system 200 as appropriate.

The O&M system 200 estimates an unobserved trouble cause based on the obtained observation data. The O&M system 200 may perform various controls on the respective devices 100, 101, and 510 in the core network 400 based on this estimated trouble cause. By performing such controls, the O&M system 200 may take various actions on the respective devices 100, 101, and 510 in the core network 400.

Examples of the observation data obtained by the macro base station 100 and the pico base station 101 include the following.

Specifically, the observation data includes an electric field intensity and a frame error rate, whether a communication with the MS 300 was successful, and whether a handover was successful, which are measured by the macro base station 100 and the pico base station 101.

The observation data has numerous kinds, and in particular, the communication monitoring system 10 as a HetNet communication system has a large number of base stations and hence numerous observation data as compared to a non-HetNet communication system. The O&M system 200 may store observation data received from the macro base station 100 and the pico base station 101 in a memory, for example, and read out the observation data from this memory as appropriate in processing, thereby enabling such a large number and many kinds of observation data to be processed.

<Exemplary Configuration of Base Station>

Figure 3:
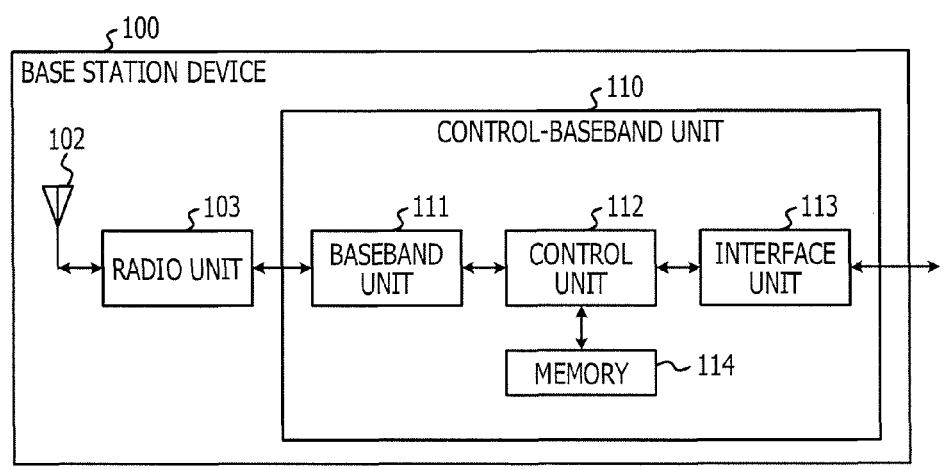
FIG. 3 illustrates an exemplary configuration of a base station device.

FIG. 3 illustrates an exemplary configuration of the macro base station 100. The pico base station 101 has a configuration identical to that of the macro base station 100, and thus description will be made on the macro base station 100 as a representative example.

The macro base station 100 includes an antenna 102, a radio unit 103, and a control-baseband unit 110.

The antenna 102 receives a radio signal transmitted from the MS 300 and transmits the received radio signal to the radio unit 103. Also the antenna 102 transmits a radio signal output from the radio unit 103 to the MS 300.

The radio unit 103 receives a radio signal through the antenna 102, and converts the received radio signal into a baseband signal by frequency conversion processing, demodulation processing, and the like. The radio unit 103 outputs the converted baseband signal to the control-baseband unit 110. The radio unit 103 also converts a baseband signal received from the control-baseband unit 110 into a radio signal of a radio band by modulation processing and frequency conversion processing. The radio unit 103 outputs the converted radio signal to the antenna 102. Meanwhile, recent mainstream device configuration is, for example, such that the radio unit 103 and the control-baseband unit 110 are connected through an interface such as a common public radio interface (CPRI).

The control-baseband unit 110 includes a baseband unit 111, a control unit 112, an interface unit 113, and a memory 114.

The baseband unit 111 receives user data and a control signal from the control unit 112, performs an error-correction coding process on the received user data and control signal, and outputs, for example, the user data through the error-correction coding process as a baseband signal to the radio unit 103. The baseband unit 111 also performs an error-correction decoding process on a baseband signal output from the radio unit 103 to extract user data and a control signal, for example. The baseband unit 111 outputs the extracted user data and the control signal to the control unit 112.

Upon receiving the user data from the interface unit 113, the control unit 112 outputs the received user data to the baseband unit 111 in a predetermined timing. In this time, the control unit 112 schedules, for example, radio resource allocation, a modulation scheme, and an error-correction coding rate for each user (or the MS 300), and generates a control signal including a result of this scheduling. The control unit 112 outputs the generated control signal to the baseband unit 111. The control unit 112 also extracts user data for each user (or the MS 300) from user data output from the baseband unit 111 in accordance with the scheduling result produced by itself, and outputs the extracted user data to the interface unit 113 and the memory 114.

The control unit 112 obtains observation data during a radio communication with the MS 300. For example, the control unit 112 obtains the observation data as follows.

Specifically, the control unit 112 measures a data amount for each MS 300 during a certain time period based on the user data received from the baseband unit 111 and the interface unit 113, and stores the measured data amount as observation data in the memory 114.

Alternatively, the control unit 112 calculates a RRC connection rate based on the number of RRC connection reconfigurations transmitted to the MS 300 during a certain time period, and stores the RRC connection rate as observation data in the memory 114.

Alternatively, the control unit 112 count the number of handovers of the MS 300 by counting the number of measurement reports received from the MS 300 through the baseband unit 111 during a certain time period, and may use this count value as observation data.

Observation data may be obtained by various methods. For example, the control unit 112 may obtain observation data based on such a control signal of a RRC connection reconfiguration generated by itself and a control signal of a measurement report received from the MS 300.

For example, the control unit 112 may store the obtained observation data in the memory 114, which is then read out from the memory 114 as appropriate and output to the interface unit 113, or may output the obtained observation data directly to the interface unit 113.

The interface unit 113 converts user data, a control signal, or observation data received from the control unit 112 into, for example, a message in a format compatible with the core network 400, and transmits the message to the core network 400. The interface unit 113 also extracts user data and a control signal from a message in a format compatible with the core network 400 which is received from the core network 400, and outputs the user data and the control signal to the control unit 112.

<Exemplary Configuration of O&M System>

Figure 4:
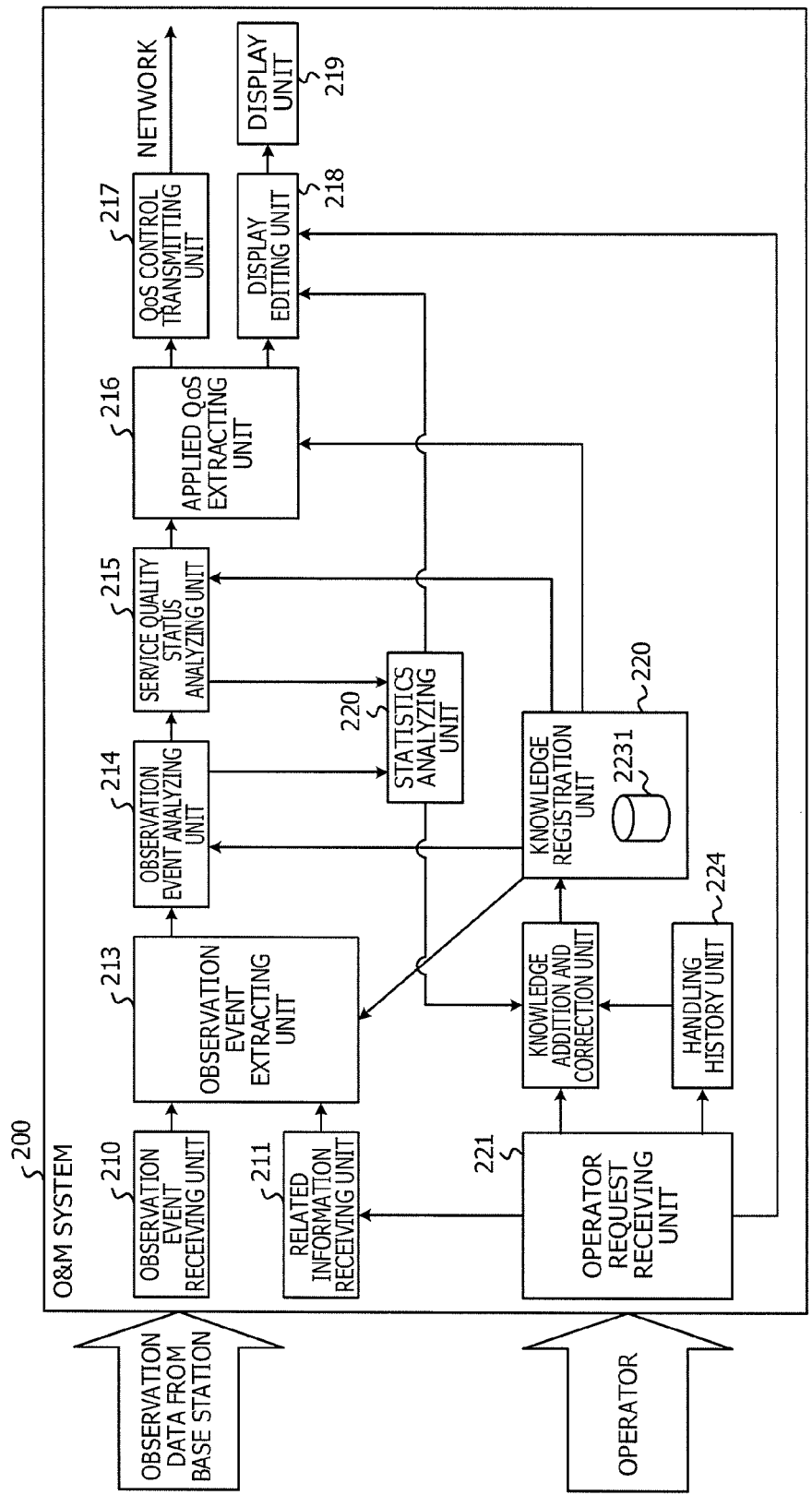
FIG. 4 illustrates an exemplary configuration of an O&M system.

FIG. 4 illustrates an exemplary configuration of the O&M system 200 according to the present embodiment. The O&M system 200 includes an observation event receiving unit 210, a related information receiving unit 211, an operator request receiving unit 221, an observation event extracting unit 213, an observation event analyzing unit 214, a service quality status analyzing unit 215, an applied quality of service (QoS) extracting unit 216, a QoS control transmitting unit 217, a display editing unit 218, and a display unit 219. The O&M system 200 further includes a statistics analyzing unit 220, a knowledge addition and correction unit 222, a knowledge registration unit 223, and a handling history unit 224. The knowledge registration unit 223 includes a knowledge DB 2231. The knowledge DB 2231 is, for example, a memory.

The observation event receiving unit 210 receives time-series observation data transmitted from the base stations 100 and 101. The received observation data is output to the observation event extracting unit 213.

The related information receiving unit 211 receives related information from the operator request receiving unit 221, and outputs the received related information to the observation event extracting unit 213. The related information includes, for example, information related to a macro cell and a pico cell such as installation locations of the base stations 100 and 101 and radio parameters, and event information such as the time and location of a concert to be held in a macro cell or a pico cell.

The observation event extracting unit 213 extracts analysis target observation data from among related information received from the related information receiving unit 211 and observation data received from the observation event receiving unit 210. The observation event extracting unit 213 extracts observation data based on, for example, regional conditions, temporal/seasonal conditions, weather characteristics, and operating states such as failure/pause of an observation device and equipment which are stored in the knowledge DB 2231. The observation event extracting unit 213 also extracts, for example, observation data corresponding to the time and location of an event, and observation data related to particular base stations 100 and 101. Moreover, the observation event extracting unit 213 extracts analysis target observation data, for example, through a comparison with past observation data stored in the knowledge DB 2231 included in the knowledge registration unit 223. As described above, the observation event extracting unit 213 may extract part of observation data received from the base stations 100 and 101 based on related information, and output the extracted observation data to the observation event analyzing unit 214. The observation event extracting unit 213 may output observation data received from the observation event receiving unit 210 directly to the observation event analyzing unit 214.

The observation event analyzing unit 214 analyzes the observation data received from the observation event extracting unit 213. For example, the observation event analyzing unit 214 outputs, as characteristic data, part of the observation data which has a value equal to or larger than a predetermined value, to the statistics analyzing unit 220 and the service quality status analyzing unit 215. Alternatively, the observation event analyzing unit 214 may output observation data other than the characteristic data, or may output the entire observation data received.

The service quality status analyzing unit 215 estimates an unobserved trouble cause based on the observation data received from the observation event analyzing unit 214. The unobserved trouble cause as an estimation target is an event that is not set as an observation target in a base station and causes a service quality degradation. The unobserved trouble cause is, for example, a natural disaster or an electric outage in a service area.

For example, the service quality status analyzing unit 215 receives information such as an estimating equation from the knowledge registration unit 223, and estimates the unobserved trouble cause using the estimating equation. Details of this estimation method will be described later.

The applied QoS extracting unit 216 determines which QoS control is to be applied based on, for example, an estimated trouble cause received from the service quality status analyzing unit 215, and an operation history read out from the knowledge registration unit 223. Alternatively, the applied QoS extracting unit 216 selects a control method for the base stations 100 and 101 based on, for example, an instruction from the service quality status analyzing unit 215, and transmits control information to the base stations 100 and 101 through the QoS control transmitting unit 217.

Examples of the QoS control include an admission control that is a control of a communication band between nodes, shaping that drops packets exceeding a limiting rate, and policing that buffers packets exceeding a limiting rate into a queue. Specifically, an exemplary QoS control reduces the amount of radio resource allocation to the MS 300, or reduces the amount of user data to the MS 300.

The QoS control transmitting unit 217 receives, from the applied QoS extracting unit 216, information indicating which QoS control is to be performed, and executes the QoS control on the core network 400 in accordance with the indicated information. For example, the QoS control transmitting unit 217 instructs the base stations 100 and 101 to set the amount of radio resource allocation to the MS 300 to be equal to or smaller than a threshold, or instructs the intra-NW device 510 (for example, the S-GW) to set the amount of user data to the MS 300 to be equal to or smaller than a threshold.

The display editing unit 218 receives, from the applied QoS extracting unit 216, the information indicating which QoS control is to be performed, and displays this information on the display unit 219. The display editing unit 218 also receives an analysis result from the statistics analyzing unit 220 and displays this received analysis result on the display unit 219. The display editing unit 218 also receives an operation information and the like by the operator from the operator request receiving unit 221, and displays this received operation information on the display unit 219. The display editing unit 218 may combine the information received from the applied QoS extracting unit 216, the statistics analyzing unit 220, and the operator request receiving unit 221 as appropriate, and display this combined information on the display unit 219.

The statistics analyzing unit 220 receives observation data from the observation event analyzing unit 214, and receives an estimated trouble cause from the service quality status analyzing unit 215. The statistics analyzing unit 220, performs various analyses on observation data, such as sorting received information in a time-series order, and associating it with similar observation data in the past. The statistics analyzing unit 220 outputs a result of this analysis to the display editing unit 218.

The operator request receiving unit 221 receives related information from, for example, the operator that operates the O&M system 200. The operator request receiving unit 221 outputs the received related information to the related information receiving unit 211. This operator related information includes information related to specification and correction of analysis conditions such as an observation list of observation data, a collection duration of observation data, registration and change of a base station as an observation target, a threshold condition of observation data, an analysis target list, an estimation duration, and a trigger condition. The operator request receiving unit 221 outputs the operator related information to the knowledge addition and correction unit 222.

The operator request receiving unit 221 receives, for example, information about an operation performed by the operator that operates the O&M system 200. This operation information is, for example, information related to a series of operations performed by the operator, and to a QoS control method or a handling method (hereinafter, these two methods are not distinguished) performed by the operator. The operator request receiving unit 221 outputs the operation information to the handling history unit 224.

The operator request receiving unit 221 outputs, for example, display information for the operator that is used to operate the O&M system 200. The display information includes, for example, information related to specification and change of display conditions such as a display format and a display zone. The operator request receiving unit 221 outputs the display information to the display editing unit 218.

The knowledge addition and correction unit 222 outputs as knowledge information, for example, an analysis result of observation data obtained by the statistics analyzing unit 220, a handling history obtained from the handling history unit 224, and operator related information obtained from the operator request receiving unit 221 to the knowledge registration unit 223. The knowledge addition and correction unit 222 may categorize the knowledge information according to various attributes, for example, for each device and equipment. Moreover, the knowledge addition and correction unit 222 may associate the knowledge information with the history of applied QoSs.

The knowledge registration unit 223 stores the knowledge information received from the knowledge addition and correction unit 222 in the knowledge DB 2231. The knowledge registration unit 223 reads out as appropriate, for example, knowledge information and the like stored in the knowledge DB 2231, and outputs this knowledge information to the observation event extracting unit 213, the observation event analyzing unit 214, and the service quality status analyzing unit 215. The knowledge DB 2231 also stores information related to the estimating equation used by the service quality status analyzing unit 215 as described above.

The handling history unit 224 receives operation information from the operator request receiving unit 221, and outputs this operation information to the knowledge addition and correction unit 222 as a handling history. The handling history is also stored as knowledge in the knowledge DB 2231.

Operation Example

Description of an operation example is first made on the entire operation example in the communication monitoring system 10, and then on an operation example in the O&M system 200. Next, an estimation method performed by the O&M system 200 will be described in detail, followed by description with a specific example of observation data on how the estimation is performed.

Entire Operation Example

Figure 5:
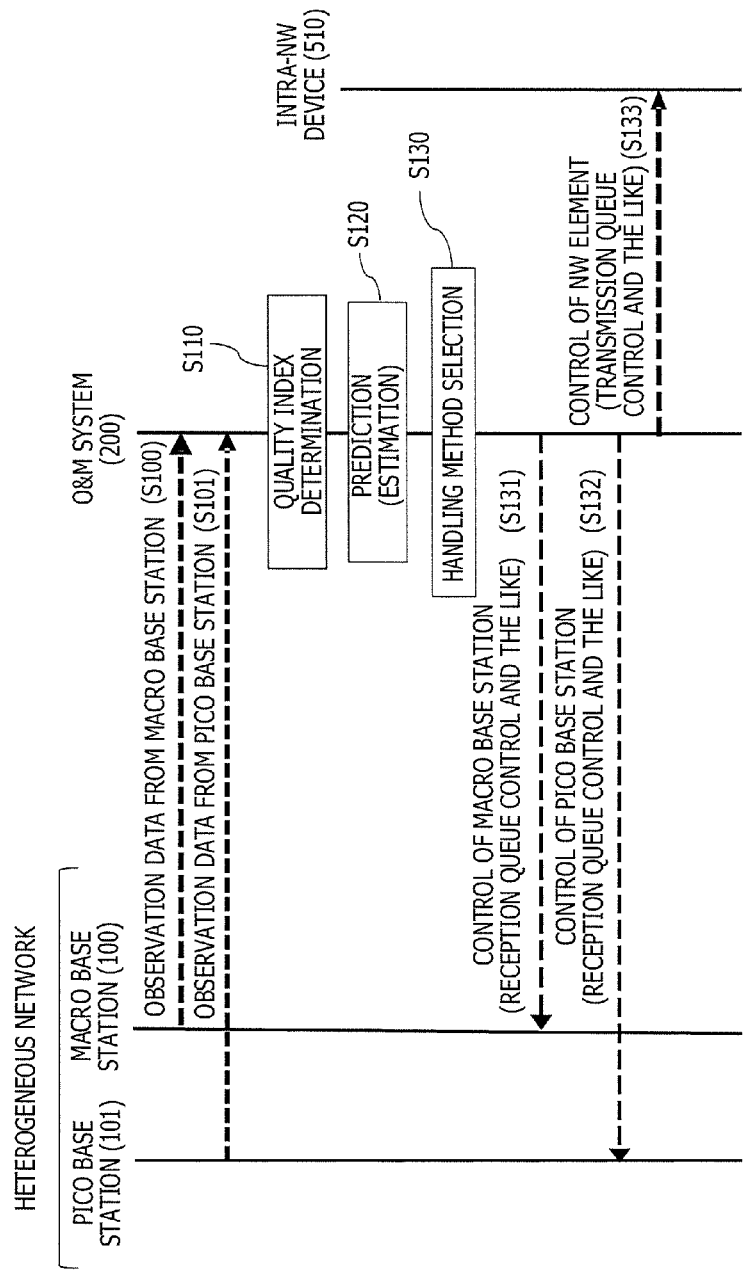
FIG. 5 is a sequence diagram illustrating an operation example of the communication monitoring system.

FIG. 5 is a sequence diagram illustrating the entire operation example of the communication monitoring system 10 according to the present embodiment. Upon detecting observation data, the macro base station 100 transmits the detected observation data to the O&M system 200 (S100).

Upon detecting observation data, the pico base station 101 transmits the observation data thus detected to the O&M system 200 (S101). S100 and S101 may be performed in the opposite order.

Next, the O&M system 200 performs a quality index determination based on the obtained observation data (S110). For example, the O&M system 200 determines based on the obtained observation data whether a predetermined QoS threshold is satisfied in the service areas 100-M and 100-P.

Next, the O&M system 200 estimates an unobserved trouble cause based on the obtained observation data (S120). The estimation method will be described later in detail.

Next, the O&M system 200 selects a handling method based on a result of the quality index determination and an estimated trouble cause (S130). The selection of a handling method is made, for example, through an operation on the O&M system 200 by the operator of the O&M system 200.

After the selection of a handling method, the O&M system 200 controls the macro base station 100 and the pico base station 101 by the selected handling method (S131 and S132). The O&M system 200 also controls the intra-NW device 510 by the selected handling method (S133).

<Operation Example in O&M System>

Figure 6:
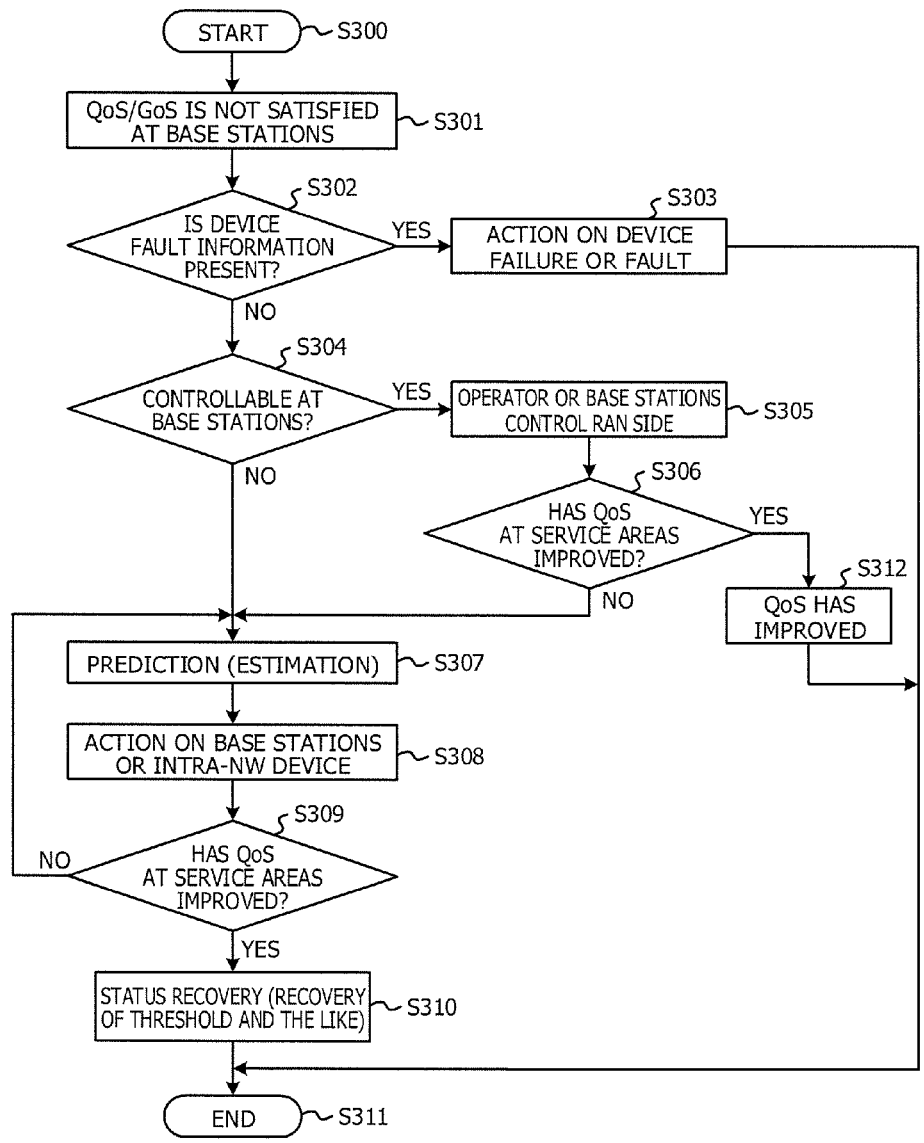
FIG. 6 is a flowchart of an operation example of the O&M system.

Next, an operation example in the O&M system 200 will be described. FIG. 6 is a flowchart of the operation example of the O&M system 200 according to the present embodiment.

Once having started processing (S300), the O&M system 200 determines based on received observation data whether a predetermined QoS and a grade of service (GoS) are satisfied in the service areas 100-M and 100-P. If the QoS and GoS are not satisfied, the O&M system 200 performs the following processing (S301). For example, the service quality status analyzing unit 215 reads out, from the knowledge registration unit 223, a QoS threshold for observation data received from the observation event analyzing unit 214 and determines whether the observation data satisfies this QoS threshold.

If having determined that the predetermined QoS and GoS are satisfied in the service areas 100-M and 100-P, the O&M system 200 may finish this series of processes without performing any processing or may perform the following processing.

Next, the O&M system 200 determines presence of device fault information (S302). For example, the service quality status analyzing unit 215 determines whether fault information of the base stations 100 and 101 and the like is included in the observation data received from the observation event analyzing unit 214. Unlike the observation data, the fault information may include a particular code, for example, which allows the service quality status analyzing unit 215 to determine based on presence of this code whether the fault information is included.

If having determined that fault information is present (Yes at S302), the O&M system 200 takes action against a failure or fault for a relevant device (S303), and finishes this series of processes (S303). For example, the service quality status analyzing unit 215 outputs the fault information to the display editing unit 218 through the applied QoS extracting unit 216, and displays the fault information on the display unit 219. This prompts, for example, the operator of the O&M system 200 to take action against the fault occurring in the device, such as replacing the device.

If having determined that no fault information is present (No at S302), the O&M system 200 determines whether observation data is controllable in the base stations 100 and 101 (S304). For example, the service quality status analyzing unit 215 determines whether the observation data received from the observation event analyzing unit 214 is observation data included in a group of observation data controllable in the base stations 100 and 101. The observation data included in such a group may be controlled to satisfy the predetermined QoS through control of the base stations 100 and 101.

If the O&M system 200 has determined that the observation data is controllable in the base stations 100 and 101 (Yes at S304), the operator or the base stations control a radio access network (RAN) side (S305).

This processing involves, for example, the following processing. That is, if having determined that the observation data is controllable in the base stations 100 and 101, the service quality status analyzing unit 215 provides the applied QoS extracting unit 216 with an instruction for controlling the base stations 100 and 101, and the applied QoS extracting unit 216 selects a control method based on this instruction. The applied QoS extracting unit 216 instructs the QoS control transmitting unit 217 to transmit control information to the base stations 100 and 101. Then, the base stations 100 and 101 are controlled by the selected control method.

Next, the O&M system 200 determines whether the QoS has improved in the service areas 100-M and 100-P (S306). For example, the service quality status analyzing unit 215 obtains new observation data as a result of controlling the base stations 100 and 101 (S305), and may determine whether the QoS has improved based on whether this obtained observation data exceeds the threshold.

If the QoS has improved (Yes at S306; S312), the O&M system 200 finishes this series of processes (S311).

If having determined that the observation data is not controllable in the base stations 100 and 101 (No at S304) or the QoS has not improved in the service areas 100-M and 100-P (No at S306), the O&M system 200 estimates observation data (S307). This estimation will be described in detail later.

Based on a result of the estimation, the O&M system 200 then determines an action to be performed on the base stations 100 and 101 or a device in the core network 400, and performs this action (S308). For example, the applied QoS extracting unit 216 determines a handling method based on, for example, observation data obtained from the service quality status analyzing unit 215, and instructs the QoS control transmitting unit 217 to transmit control information related to the handling method to a target device. Accordingly, the handling method is executed in this control target device.

Next, if the QoS has improved in the service areas 100-M and 100-P, the O&M system 200 performs status recovery such as recovery of the threshold (S310), and then finishes this series of processes (S310). For example, if observation data, obtained by executing the handling method, exceeds the threshold, the service quality status analyzing unit 215 determines that the QoS has improved, and instructs the applied QoS extracting unit 216 about the handling method. Having received this instruction, the applied QoS extracting unit 216 determines to perform control to recover the threshold, and instructs the QoS control transmitting unit 217 about this control. The QoS control transmitting unit 217 then transmits control information indicating about the recovery of the threshold to the target device. Accordingly, the status recovery is performed.

If the QoS has not improved in the service areas 100-M and 100-P (No at S309), the process proceeds to S307 and the O&M system 200 performs the processing described above. In the O&M system 200, the estimation (S307) and the execution (S308) of the handling method on the base stations 100 and 101 or the device in the core network 400 are repeated until the QoS is improved in the service areas 100-M and 100-P.

<Estimation Method>

Figure 7:
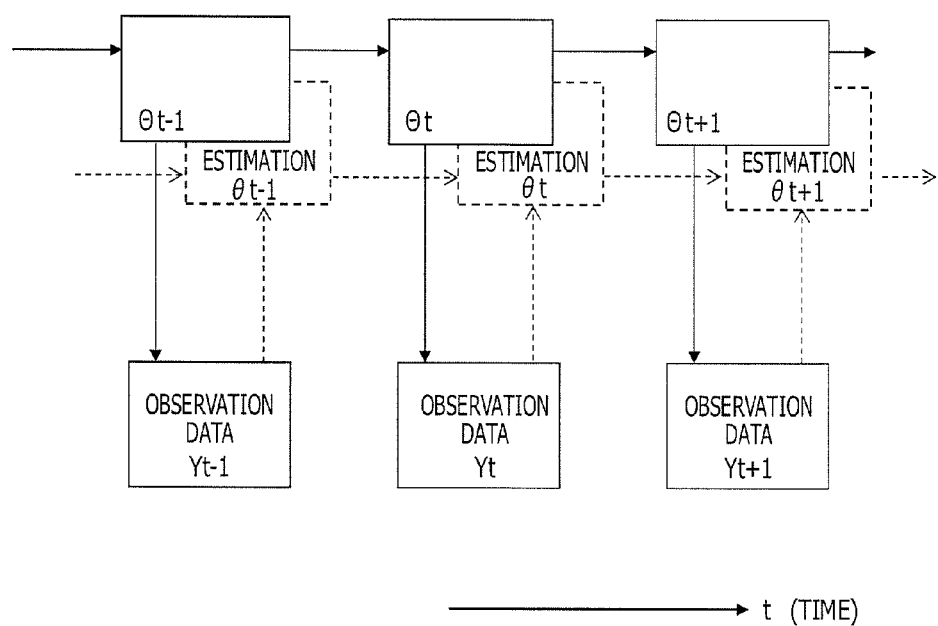
FIG. 7 illustrates a model of a basic concept of prediction (estimation)

FIG. 7 is a model illustrating an estimation algorithm according to the present embodiment, and illustrates that a trouble cause unobserved (in reality) (hereinafter, referred to as the "unobserved trouble cause") $\Theta_t$ and observation data $Y_t$ change with an observation time t. For example, when observation data $Y_t$ is obtained in an observation time t, it may be determined that the observation data $Y_t$ is obtained because of an unobserved trouble cause $\Theta_t$.

Examples of the unobserved trouble cause $\Theta_t$ include an increase of temperature to a threshold or more, and occurrence of a natural disaster such as earthquake. Examples of the observation data $Y_t$ include a call connection rate, a handover success rate, the number of outgoing calls, and a packet loss rate. For example, such an event may occur that the call connection rate decreases below a predetermined value because of a natural disaster. In this case, the unobserved trouble cause $\Theta_t$ is "natural disaster", and the observation data $Y_t$ is "decrease of the call connection rate below the predetermined value".

However, when observation data $Y_t$ is obtained in the communication monitoring system 10 used at present, any unobserved trouble cause $\Theta_t$ may not be identified as a cause thereof because the observation data $Y_t$ has many kinds. For example, when such an event occurs that the packet loss rate is higher than a predetermined value, a trouble cause may be such that installation of a building that blocks radio wave in a service area is inducing the radio wave to hardly reach a region in the service area. In this case, although the trouble cause is "installation of the building that blocks radio wave in the service area", the installation of the building in the service area is unlikely to be identified based on observation data obtained by the base station 100 and the like. However, various pieces of the observation data other than the packet loss rate allow for, for example, an estimation that "radio wave does not reach part of the service area" although it is not allowed to identify the trouble cause of "installation of the building that blocks radio wave in the service area".

Thus, when observation data $Y_t$ is obtained, this observation data alone does not allow the unobserved trouble cause $\Theta_t$ to be identified, and therefore the unobserved trouble cause $\Theta_t$ may be thus considered to be hidden.

Accordingly, since the unobserved trouble cause $\Theta_t$ of the obtained observation data $Y_t$ may not be directly identified at some cases, an estimating or estimated trouble cause (hereinafter, referred to as the "estimated trouble cause") $\theta_t$ which estimates or is estimated for an actual unobserved trouble cause $\Theta_t$ is computed. In the above-described example of the packet loss rate, the unobserved trouble cause $\Theta_t$ is "installation of the building that blocks radio wave in the service area", whereas the estimated trouble cause $\theta_t$ is, for example, "radio wave does not reach part of the service area". The estimated trouble cause $\theta_t$ may be computed through calculation with an expression representing the relation between the observation data $Y_t$ and the estimated trouble cause $\theta_t$ as described below, or using a matrix table (hereinafter, referred to as the "matrix") representing the correspondence relation between a result of comparing a plurality of pieces of observation data $Y_t$ to a threshold and the estimated trouble cause $\theta_t$. An exemplary calculation of the estimated trouble cause $\theta_t$ through the matrix will be described later in Operation Example 1.

Next, the estimation method will be described with reference to FIGS. 8 and 9.

The following describes an estimation method using the expression representing the relation between the observation data $Y_t$ and the estimated trouble cause $\theta_t$.

Figure 8:
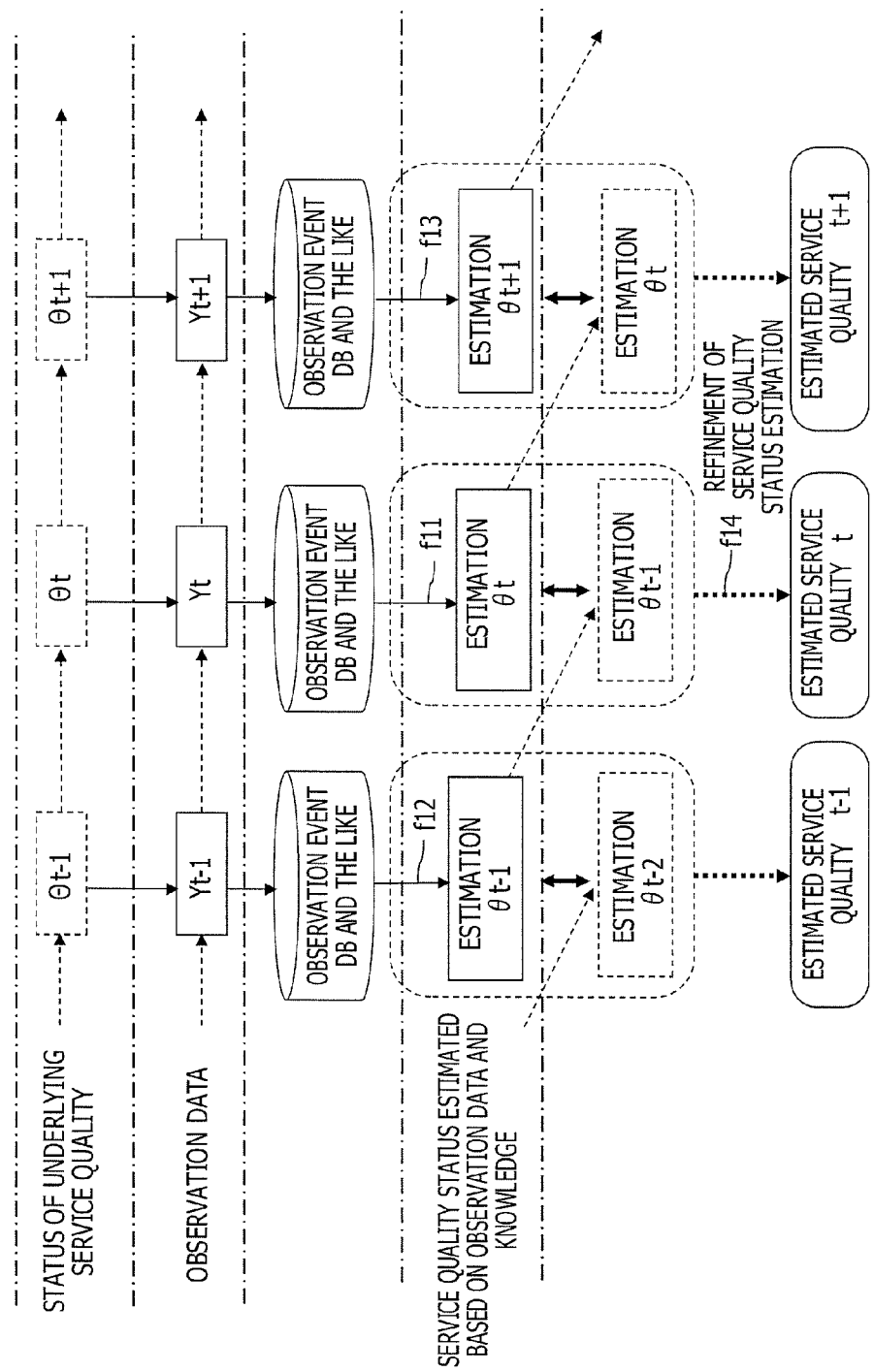
FIG. 8 illustrates an entire model of the prediction (estimation)

FIG. 8 is a time-series diagram illustrating the relation among the unobserved trouble cause $\Theta_t$, the observation data Y, and the estimated trouble cause θ.

The observation data $Y_t$ may be considered to be data with the unobserved trouble cause $\Theta_t$ becoming apparent, and thus may be expressed in Expression (1) below, for example.

$$Y_t = f_t \cdot \Theta_t + v_t \quad (1)$$

In this expression, $v_t$ represents an observation error, and $f_t$ is a coefficient representing the relation between the unobserved trouble cause $\Theta_t$ and the observation data $Y_t$. For example, $f_t$ may be a numerical value indicating a ratio of trouble causes to be obtained as the observation data $Y_t$ with respect to a plurality of existing unobserved trouble causes $\Theta_t$.

Similarly, the observation data $Y_t$ and the estimated trouble cause $\theta_t$ have a relation expressed by, for example, Expression (2) below.

$$Y_t = F_t \cdot \theta_t + v_t \quad (2)$$

In this expression, $v_t$ represents the observation error, and $F_t$ is a coefficient representing the relation between the estimated trouble cause $\theta_t$ and the observation data $Y_t$. For example, $F_t$ may be a numerical value indicating a ratio of trouble causes to be obtained as the observation data $Y_t$ with respect to a plurality of existing estimated trouble causes $\theta_t$.

For example, the O&M system 200 calculates the estimated trouble cause $\theta_t$ from the observation data $Y_t$ in an observation time t using Expression (2) (f11). The calculation is carried out by rewriting Expression (2) as follows:

$$\theta_t = (Y_t - v_t)/F_t \quad (3)$$

Similarly, the estimated trouble causes $\Theta_{t-1}$ and $\Theta_{t+1}$ in the observation time t−1 and the observation time t+1 are calculated by expressions below (f12 and f13).

$$\theta_{t-1}=(Y_{t-1}-v_{t-1})/F_{t-1} \quad (4)$$

$$\theta_{t+1}=(Y_{t+1}-v_{t+1})/F_{t+1} \quad (5)$$

In this manner, the O&M system 200 estimates the estimated trouble cause $\theta_t$ from the observation data for each observation time.

For a trouble, there may exist a single estimated trouble cause $\theta_t$, but a plurality of estimated trouble causes $\theta_t$ may exist. When a plurality of estimated trouble causes $\theta_t$ exist, it is difficult to take actions for all the estimated trouble causes $\theta_t$. Thus, the O&M system 200 refines the estimated trouble causes $\theta_t$ in the observation time t (f14), for example.

The following describes the relation between the estimated trouble cause $\theta_t$ in the observation time t and the estimated trouble cause $\theta_{t-1}$ in the observation time t−1.

The unobserved trouble cause $\Theta$ temporally changes. Thus, the unobserved trouble cause $\Theta_t$ and the unobserved trouble cause $\Theta_{t-1}$ may be expressed by, for example, Expression (6) below.

$$\Theta_t = g_t \cdot \Theta_{t-1} + w_t \quad (6)$$

In this expression, $w_t$ represents an observation error, and $g_t$ is a coefficient representing the relation between the unobserved trouble cause $\Theta_t$ and the unobserved trouble cause $\Theta_{t-1}$.

Similarly, the estimated trouble cause $\theta_t$ and the estimated trouble cause $\theta_{t-1}$ have a relation represented by, for example, Expression (7) below.

$$\theta_t = G_t \cdot \theta_{t-1} + w_t \quad (7)$$

In this expression, $w_t$ represents the observation error, and $G_t$ is a coefficient representing the relation between the estimated trouble cause $\theta_t$ and the estimated trouble cause $\theta_{t-1}$.

In this manner, the estimated trouble cause $\theta_t$ has a certain relation with the estimated trouble cause $\theta_{t-1}$. Thus, the O&M system 200 performs refinement using, for example, the estimated trouble cause $\theta_{t-1}$ so as to improve the accuracy of the estimated trouble cause $\theta_t$.

The refinement of the estimated trouble cause $\theta_t$ involves a comparison of, for example, the estimated trouble cause $\theta_t$ in the observation time t and the estimated trouble cause $\theta_{t-1}$ in the observation time t−1 so as to extract a trouble cause to take action against. When as a result of the comparison, for example, the two estimated trouble causes $\theta_t$ and $\theta_{t-1}$ are identical, the O&M system 200 determines no trouble cause has newly generated after the observation time t−1, and extracts no trouble to take action against. If as a result of the comparison a trouble cause exists, for example, in the estimated trouble cause $\theta_t$ but not in the estimated trouble cause $\theta_{t-1}$, the O&M system 200 extracts this trouble cause as a trouble cause to take action against.

The trouble cause $\theta_t$ temporally changes, and the estimated trouble cause $\theta_t$ in the observation time t is related to the estimated trouble cause $\theta_{t-1}$ in the observation time t−1. For example, when an identical factor is included in the estimated trouble cause $\theta_t$ in the observation time t and the estimated trouble cause $\theta_{t-1}$ in the observation time t−1, this factor is responsible for the continuing estimated trouble cause, and the importance and urgency of action to take may be determined accordingly.

The estimation using the expression representing the relation between the observation data $Y_t$ and the estimated trouble cause $\theta_t$ involves the following processing, for example.

The service quality status analyzing unit 215 reads out the observation data $Y_t$ and Expression (2) from the knowledge DB 2231 in the knowledge registration unit 223. Expression (2) is stored in the knowledge DB 2231 in the knowledge registration unit 223, for example, through an operation of the O&M system 200 by the operator of the O&M system. The service quality status analyzing unit 215 obtains Expression (3) by rewriting Expression (2), substitutes the observation data $Y_t$ into Expression (3), and obtains the estimated trouble cause $\theta_t$ (f11). The service quality status analyzing unit 215 stores the estimated trouble cause $\theta_t$ in the knowledge DB 2231 in the knowledge registration unit 223.

Next, the service quality status analyzing unit 215 reads out the estimated trouble cause $\theta_{t-1}$ from the knowledge DB 2231 in the knowledge registration unit 223. The estimated trouble cause $\theta_{t-1}$ is assumed to have been calculated by the service quality status analyzing unit 215 in the observation time t−1 (f12) and be stored in the knowledge DB 2231 in the knowledge registration unit 223.

Next, the service quality status analyzing unit 215 performs the refinement of the estimated trouble cause $\theta_t$ using the read estimated trouble cause $\theta_{t-1}$ (f14). For example, the service quality status analyzing unit 215 compares the two estimated trouble causes $\theta_t$ and $\theta_{t-1}$. The service quality status analyzing unit 215 extracts, for example, a trouble cause found in the comparison to exist in the estimated trouble cause $\theta_t$ but not in the estimated trouble cause $\theta_{t-1}$. The service quality status analyzing unit 215 outputs the extracted trouble cause to the applied QoS extracting unit 216. In the refinement of the estimated trouble cause $\theta_t$, the service quality status analyzing unit 215 may use not only the estimated trouble cause $\theta_{t-1}$ but also a result of any past refinement and any trouble cause in or before the observation time t−2, for example.

Figure 9:
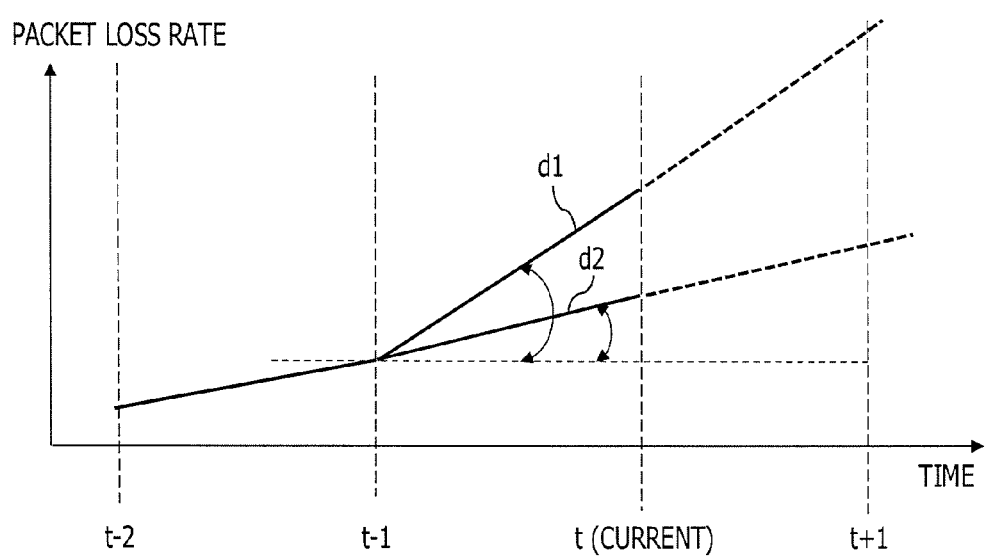
FIG. 9 illustrates a prediction (estimation) method with a packet loss rate as an example.

The following describes an example of actual estimation and refinement with reference to FIG. 9. FIG. 9 is a graph illustrating a change in the packet loss rate as one of the observation data.

As illustrated in FIG. 9, packet loss rates at Some cases are identical in the observation time t−1, but are different in the observation time t because of various trouble causes $\theta_t$.

A case will be described in which the packet loss rate has a change d1. The change d1 (change in the packet loss rate from the observation time t−1 to the observation time t) is larger than a change in the packet loss rate from the observation time t−2 to the observation time t−1. This increase of the change in the packet loss rate is thought to be caused by, for example, a new trouble cause not existing in the estimated trouble cause $\theta_{t-1}$ but existing in the estimated trouble cause $\theta_t$.

Assume that the trouble cause existing only in the estimated trouble cause $\theta_t$ is, for example, "insufficient memory for queuing received packets". The applied QoS extracting unit 216 performs, for example, a control for the base station 100 to increase the size of a packet reception queue so as to resolve the trouble cause of "insufficient memory for queuing received packets".

A case will be described in which the packet loss rate is a change d2. The change d2 (change in the packet loss rate from the observation time t−1 to the observation time t) is substantially the same as a change in the packet loss rate from the observation time t−2 to the observation time t−1. In other words, the packet loss rate has not changed substantially, which suggests that a trouble cause for the packet loss rate exists, but no new trouble cause has generated.

If the two estimated trouble causes $\theta_t$ and $\theta_{t-1}$ are the same, the service quality status analyzing unit 215 finishes processing without outputting any trouble cause to the applied QoS extracting unit 216.

<Enhanced Efficiency of Work by Operator>

Figure 10:
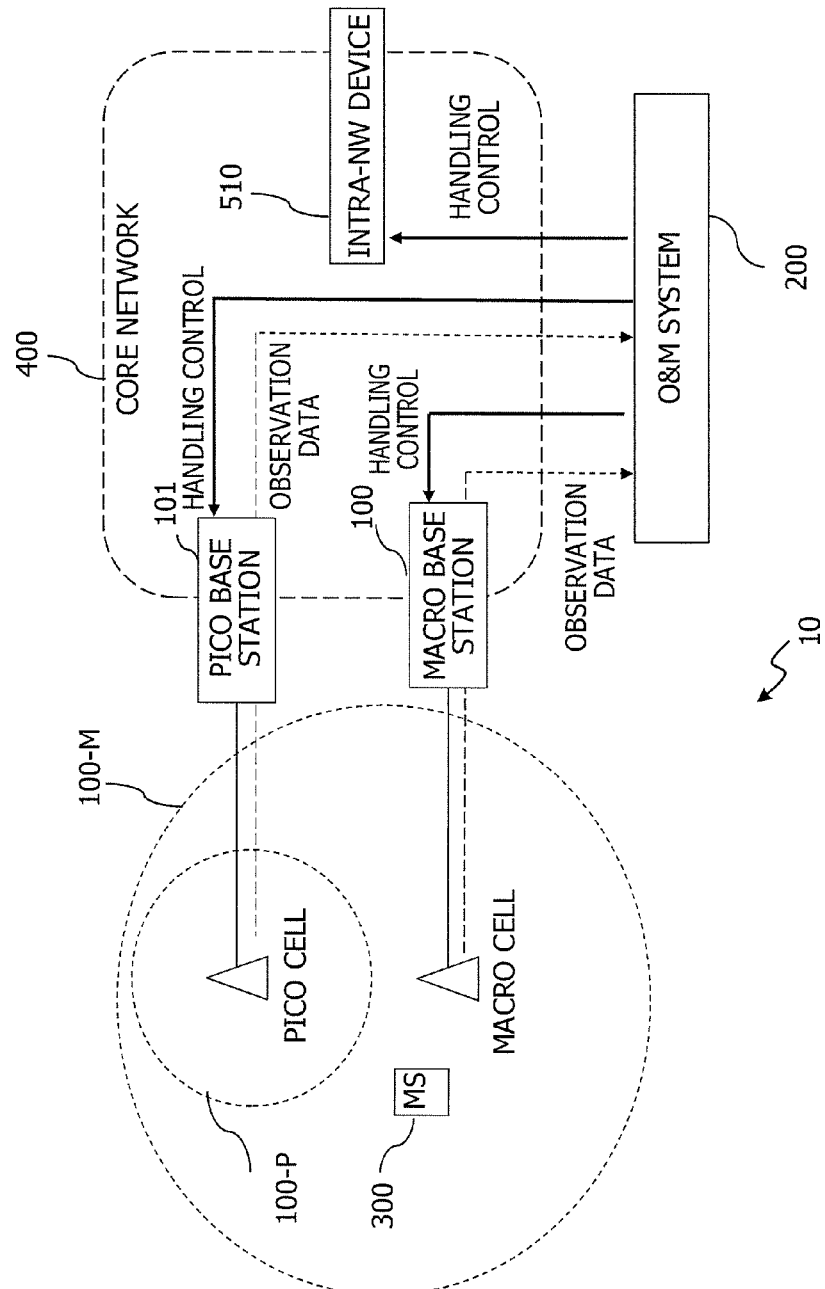
FIG. 10 illustrates an exemplary configuration of the communication monitoring system.

FIG. 10 illustrates a control flow of the communication monitoring system according to the present embodiment.

FIG. 10 corresponds to FIG. 2.

The base stations 100 and 101 obtain observation data when performing radio communications with the MS 300. The macro base station 100 and the pico base station 101 transmit the obtained observation data to the O&M system 200 as appropriate.

The O&M system 200 estimates the estimated trouble cause $\theta_t$ based on the obtained observation data. The O&M system 200 performs a QoS control on the core network 400 based on the estimated trouble cause $\theta_t$. The O&M system 200 may take various actions on the devices 100, 101, and 510 in the core network 400 by performing such a control. The O&M system 200 controls the base stations 100 and 101 to, for example, adjust radio parameters to increase the transmission power of radio wave, or limit the number of handovers per unit time. In addition, the O&M system 200 controls the S-GW as one of the intra-NW device 510 to, for example, change the size of the packet reception queue.

Figure 11:
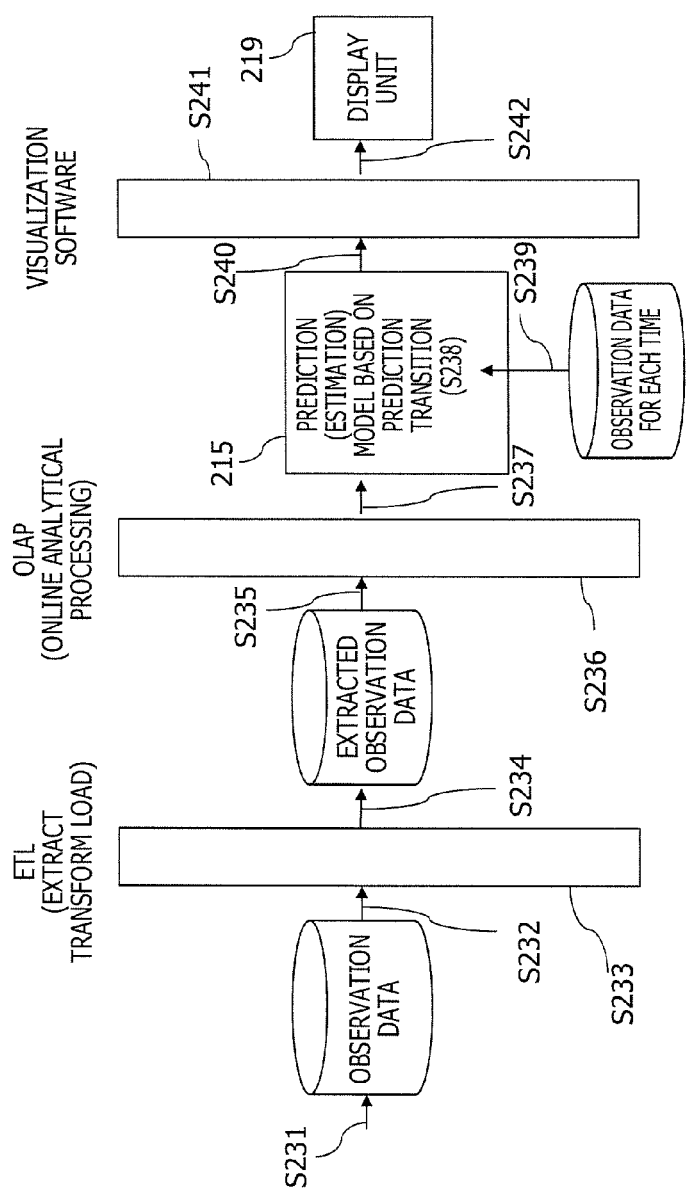
FIG. 11 illustrates processing image of the prediction (estimation)

FIG. 11 illustrates an exemplary estimation processing in the O&M system 200.

The O&M system 200 receives observation data from the base stations 100 and 101 through the observation event receiving unit 210 (S231). The observation event receiving unit 210 outputs the received observation data to an internal memory 2131 in the observation event extracting unit 213 (S232).

Next, the observation event extracting unit 213 processes the received observation data, for example, through the process extract, transform, and load (ETL) (S233). The ETL is, for example, processing that determines observation data exceeding a certain threshold as noise data among a large amount of received observation data and excludes this noise data from the analysis target list. In addition, the ETL is, for example, processing that corrects received observation data into a particular format or temporally sorts received observation data. The ETL is implemented as software, for example. The observation event extracting unit 213 extracts observation data to be a determination target using the ETL (S234). The observation event extracting unit 213 outputs the extracted observation data (hereinafter, referred to as "extracted observation data") to an internal memory 2141 in the observation event analyzing unit 214 (S235).

Next, the observation event analyzing unit 214 analyzes the received extracted observation data, for example, through online analytical processing (OLAP) (S236). The OLAP is, for example, processing that puts a large amount of extracted observation data into a multi-dimensional database structure to enable a fast analysis. In the OLAP, for example, observation data having a characteristic exceeding a certain threshold is extracted from among the large amount of extracted observation data, and the transition and tendency of any measured value are analyzed. The OLAP is executed as software, for example. The observation event analyzing unit 214 extracts characteristic observation data through the OLAP, and outputs this characteristic observation data to the service quality status analyzing unit 215 (S237).

Next, the service quality status analyzing unit 215 takes out observation data for each time stored in the knowledge DB 2231 (S239). The service quality status analyzing unit 215 estimates the estimated trouble cause $\theta_t$ from the observation data for each time thus taken out and the received characteristic observation data (S238). The service quality status analyzing unit 215 outputs the estimated trouble cause $\theta_t$ to the statistics analyzing unit 220. The statistics analyzing unit 220 outputs the received estimated trouble cause $\theta_t$ to the display editing unit 218 (S240).

Next, the display editing unit 218 edits the received estimated trouble cause $\theta_t$ using various kinds of visualizing software (S241), and outputs the edited estimated trouble cause $\theta_t$ to the display unit 219 (S242). The display unit 219 displays the received data on, for example, a monitor used by the operator of the O&M system (S243).

Figure 12:
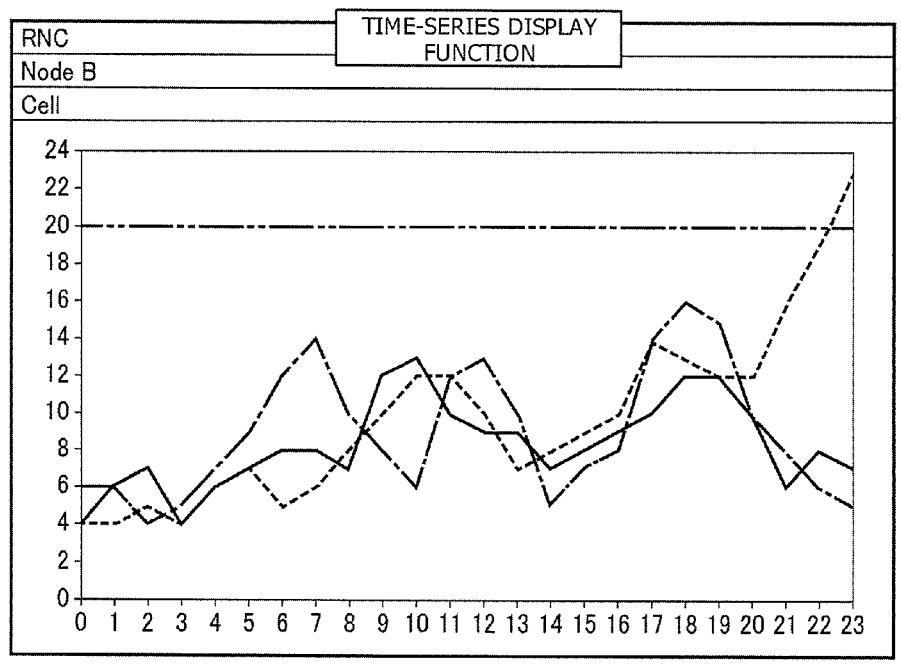
FIG. 12 illustrates an exemplary display content of the O&M system.

FIG. 12 is a graph illustrating the time-series transition of the call drop rate in a base station. The operator of the O&M system checks the graph in FIG. 12 on, for example, the monitor of the O&M system 200, and recognizes that the call drop rate exceeds a threshold in 22:00. For example, the O&M system 200 takes action to decrease the call drop rate when the call drop rate has exceeded the threshold. The O&M system 200 controls the base station to, for example, reject a handover from another service area or increase a radio transmission power.

1. Operation Example 1

Next, an operation example will be described.

The following describes each operation example when observation data indicates a decrease of the connection rate, an increase of the call drop rate, and a decrease of the handover success rate.

Figure 13:
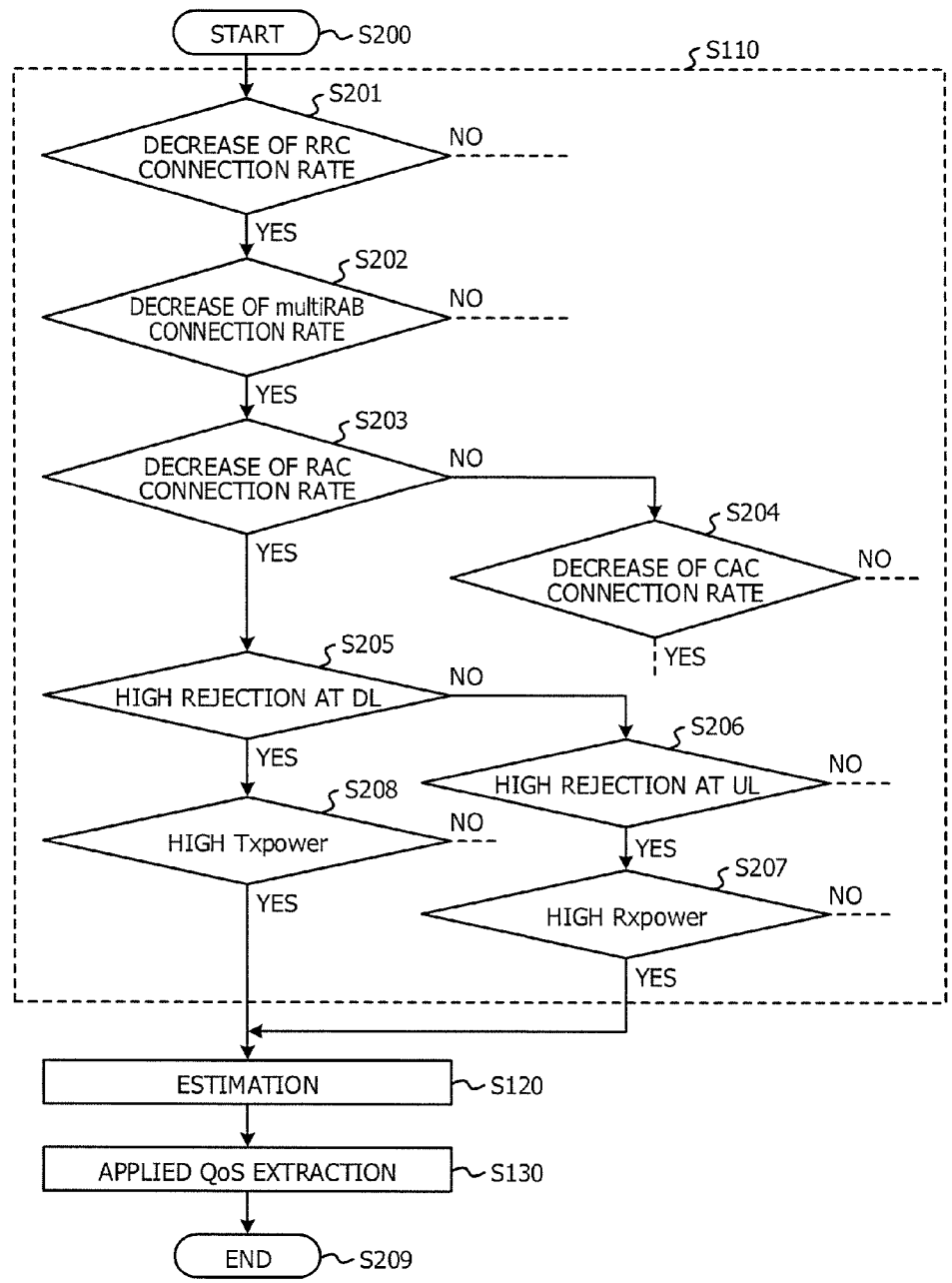
FIG. 13 is a flowchart for an example with a decrease of a call connection rate.

FIG. 13 illustrates an operation example when observation data indicates the decrease of the call connection rate. FIG. 16 illustrates an operation example when observation data indicates the increase of the call drop rate. FIG. 17 illustrates an operation example when observation data indicates the decrease of the handover success rate.

Note that S110, S120, and S130 in operating flows in FIGS. 13, 16, and 17 respectively correspond to processes at S110, S120, and S130 performed by the O&M system 200 in the sequence in FIG. 5.

FIG. 13 will be described.

Examples of observation data indicating the decrease of the call connection rate include a radio resource control (RRC) connection rate (S201), a multi radio access bearer (multiRAB) connection rate (S202), and a radio access controller (RAC) connection rate (S203). When observation data indicating the decrease of the connection rate is obtained, the O&M system 200 starts processing (S200), and performs the quality index determination (S110). Specifically, the service quality status analyzing unit 215 compares, to thresholds, the RRC connection rate (S201), the multi-RAB connection rate (S202), and the RAC connection rate (S203) as the observation data indicating the decrease of the call connection rate among the entire observation data, for example. The service quality status analyzing unit 215 outputs a result of the comparison to the applied QoS extracting unit 216. The applied QoS extracting unit 216 extracts and executes a QoS control in accordance with this comparison result of the observation data. Meanwhile, the applied QoS extracting unit 216 may finish processing without performing any QoS control (S209) if, for example, the RRC connection rate has not decreased (No at S201) or the multiRAB connection rate has not decreased (No at S202).

Note that the quality index determination (S110) in FIG. 13 is merely an example, and observation data illustrated in FIG. 14 may be a determination target.

Next, if the QoS in the service area has not improved as a result of a QoS control in the quality index determination (S110), the service quality status analyzing unit 215 may estimate the estimated trouble cause (S120).

FIG. 15 is a table illustrating an example of the estimation processing using the matrix. The table in FIG. 15 is stored in the knowledge DB 2231 in the knowledge registration unit 223 through, for example, an operation by the operator of the O&M system.

In FIG. 15, "Own Cell Traffic", "Other Cell Traffic", "Call Drop", and "Other Cell RL-F" each indicate observation data to be compared with a threshold. Each observation data may be not only one piece of observation data but also a combination of a plurality of pieces of observation data. For example, the numerical value of "Other Cell Traffic" may be obtained by summing the number of RRC connection requests in all neighboring cells at Some cases.

If observation data to be determined using the matrix is already determined in the quality index determination (S110), the service quality status analyzing unit 215 uses a result determined in the quality index determination (S110). For example, "Own Cell Traffic" in FIG. 15 may correspond to the RRC connection rate in the quality index determination (S110). In this case, the service quality status analyzing unit 215 determines the own cell traffic based on a result of a determination (S201) of the decrease of the RRC connection rate in the quality index determination (S110). For example, the service quality status analyzing unit 215 determines the own cell traffic to be "High" if the result of the determination (S201) of the decrease of the RRC connection rate is "Yes", or determines the own cell traffic to be "Low" if the result is "No".

If observation data to be determined using the matrix is not determined in the quality index determination (S110), the service quality status analyzing unit 215 reads out target observation data and a threshold from the knowledge DB 2231 in the knowledge registration unit 223. The service quality status analyzing unit 215 makes a determination by comparing the observation data and the threshold. For example, the service quality status analyzing unit 215 determines the own cell traffic to be "High" if the observation data "Own Cell Traffic" has a numerical value equal to or larger than the threshold, or determines the own cell traffic to be "Low" if the observation data "Own Cell Traffic" has a numerical value smaller than the threshold.

In this manner, the service quality status analyzing unit 215 obtains a result of determination on observation data in the matrix in FIG. 15.

Based on the determination result of each observation data, the service quality status analyzing unit 215 searches the corresponding column in the table, and extracts the number of a trouble cause in the lowest row. For example, when the own cell traffic is "High", the other cell traffic is "High", the call drop rate is "Low", and the other cell radio link-failure (RL-F) is "High", this case corresponds to the second column from the left in the table, and the number of the corresponding trouble cause is "1". The number of a trouble cause and the estimated trouble cause corresponding to this number are previously stored as a table in the knowledge DB 2231 through, for example, an operation by the operator of the O&M system. The trouble cause "1" indicates, for example, an "increase in the inlet flow of mobile terminals into the own cell and neighboring cells".

In this manner, the O&M system 200 performs the estimation of trouble causes based on the matrix using observation data.

Next, the O&M system 200 performs applied QoS extraction processing (S130). The applied QoS extracting unit 216 extracts and executes the applied QoS control corresponding to an estimated trouble cause received from the service quality status analyzing unit 215.

Next, if the QoS in the service area has improved as a result of a QoS control, the O&M system 200 finishes processing (S209). If the QoS in the service area has not improved, the O&M system 200 may perform again the estimation processing (S120) and the applied QoS extraction (S130).

2. Operation Example 2

FIG. 16 will be described.

Examples of observation data indicating an increase of the call drop rate include the call drop rate of all calls (S211) and the call drop rate of an adaptive multi rate (AMR) (S212).

The O&M system 200 starts processing when observation data indicating the increase of the call drop rate is obtained (S210), and performs the quality index determination (S110). Specifically, the service quality status analyzing unit 215 compares, to thresholds, the call drop rate of all calls (S211) and the call drop rate of the adaptive multi rate (AMR) (S212) and the like, for example. The service quality status analyzing unit 215 outputs a result of the comparison to the applied QoS extracting unit 216. The applied QoS extracting unit 216 extracts and executes a QoS control in accordance with this comparison result of the observation data.

Note that the quality index determination (S110) in FIG. 16 is merely an example, and any observation data listed in "Increase of Call Drop Rate" in FIG. 18 may be a determination target.

Next, if the QoS in the service area has not improved as a result of the QoS control in the quality index determination (S110), the service quality status analyzing unit 215 may estimate an estimated trouble cause (S120). This estimation processing may estimate, for example, any observation data listed in "Increase of Call Drop Rate" in FIG. 18 by using a matrix as illustrated in FIG. 15. Alternatively, the estimation processing may estimate a trouble cause from observation data by using a particular coefficient as illustrated in FIG. 8. The service quality status analyzing unit 215 outputs the estimated trouble cause to the applied QoS extracting unit 216.

Next, the O&M system 200 performs the applied QoS extraction processing (S130). The applied QoS extracting unit 216 extracts and executes the applied QoS control corresponding to the estimated trouble cause received from the service quality status analyzing unit 215.

Next, if the QoS in the service area has improved as a result of the QoS control, the O&M system 200 finishes processing (S216). If the QoS in the service area has not improved, the O&M system 200 may perform again the estimation processing (S120) and the applied QoS extraction (S130).

3. Operation Example 3

FIG. 17 will be described.

Examples of observation data indicating a decrease of the handover success rate include a hard handover success rate (S221) and a radio network controller (InterRNC) handover success rate (S222).

The O&M system 200 starts processing when observation data indicating the decrease of the handover success rate is obtained (S220), and performs the quality index determination (S110). Specifically, the service quality status analyzing unit 215 compares, to thresholds, the hard handover success rate (S221) and the InterRNC handover success rate (S222), for example. The service quality status analyzing unit 215 outputs a result of the comparison to the applied QoS extracting unit 216. The applied QoS extracting unit 216 extracts and executes a QoS control in accordance with the comparison result of the observation data.

Note that the quality index determination (S110) in FIG. 17 is merely an example, and any observation data listed in "Decrease of Handover Success Rate" in FIG. 18 may be a determination target.

Next, when the QoS in the service area has not improved as a result of the QoS control in the quality index determination (S110), the service quality status analyzing unit 215 estimates an estimated trouble cause (S120). This estimation processing may estimate, for example, any observation data listed in "Decrease of Handover Success Rate" in FIG. 18 by using a matrix as illustrated in FIG. 15. Alternatively, the estimation processing may estimate a trouble cause from observation data by using a particular coefficient as illustrated in FIG. 8. The service quality status analyzing unit 215 outputs the estimated trouble cause to the applied QoS extracting unit 216.

Next, the O&M system 200 performs the applied QoS extraction processing (S130). The applied QoS extracting unit 216 extracts and executes the applied QoS control corresponding to the estimated trouble cause received from the service quality status analyzing unit 215.

Next, if the QoS in the service area has improved as a result of the QoS control, the O&M system 200 finishes processing (S226). If the QoS in the service area has not improved, the O&M system 200 may perform again the estimation processing (S120) and the applied QoS extraction (S130).

Other Embodiments

The following describes a third embodiment.

Figure 19:
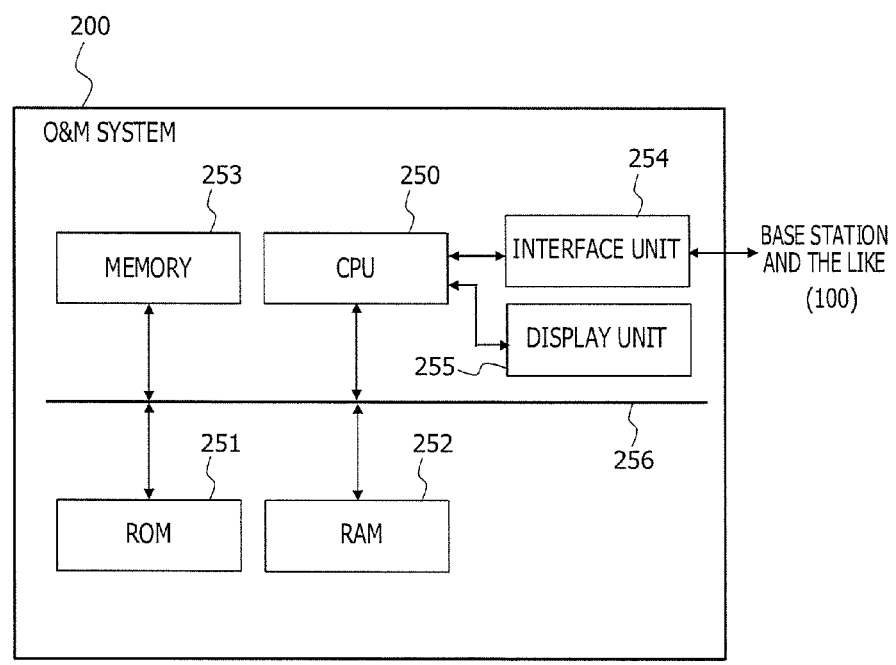
FIG. 19 illustrates an exemplary configuration of the O&M system according to an embodiment.

FIG. 19 illustrates an exemplary hardware configuration of the O&M system 200. The O&M system 200 includes a central processing unit (CPU) 250, a read only memory (ROM) 251, a random access memory (RAM) 252, a memory 253, an interface unit 254, and a display unit 255. The CPU 250 is connected to each of the ROM 251, the RAM 252, and the memory 253 through an internal bus 256.

The CPU 250 reads out a program from the ROM 251, loads the program onto the RAM 252, and executes this loaded program to achieve, for example, functions of the observation event analyzing unit 214, the service quality status analyzing unit 215, and the applied QoS extracting unit 216. The CPU 250 corresponds to, for example, the observation event analyzing unit 214, the service quality status analyzing unit 215, and the applied QoS extracting unit 216 in the second embodiment.

The CPU 250 stores observation data and the like output from the interface unit 254 in the memory 253. The CPU 250 corresponds to, for example, the knowledge registration unit 223 in the second embodiment. The memory 253 corresponds to, for example, the knowledge DB 2231 in the second embodiment.

The interface unit 254 converts data, control signals, and the like output from the CPU 250 into a format that allows transmission to the core network 400, and outputs the converted data, control signals, and the like to the base station 100. In addition, the interface unit 254 extracts and outputs data, control signal, and the like received from the core network 400 to the CPU 250. The interface unit 254 corresponds to, for example, the observation event receiving unit 210 and the QoS control transmitting unit 217 in the second embodiment.

In addition, the interface unit 254 extracts and outputs data and a screen event input by the operator of the O&M system to the CPU 250. The interface unit 254 corresponds to, for example, the operator request receiving unit 221 in the second embodiment.

The display unit 255 displays observation data output from the CPU 250 on, for example, a monitor connected to the O&M system 200. The display unit 255 receives display information output from the CPU 250 and changes, for example, the screen display format of the monitor connected to the O&M system 200. The display unit 255 corresponds to, for example, the display editing unit 218 and the display unit 219 in the second embodiment.

The example in FIG. 19 is described on the CPU 250 as an example, but the present embodiment is applicable to a control unit such as a micro processing unit (MPU) or a field programmable gate array (FPGA) other than the CPU 250.

Providing the O&M system 200 on a network may establish what is called a software defined network (SDN). The SDN is a network capable of dynamically changing the structure, configuration, setting, and the like of the network by using software. The O&M system 200 performs the estimation of trouble causes, and applies an extracted QoS based on a result of the estimation to the core network 400. Specifically, the O&M system 200 controls the base stations 100 and 101 and the intra-NW device 510. In other words, the control performed on the core network 400 executed by the O&M system 200 optimizes a data stream through the core network 400 accordingly. Thus, providing the O&M system 200 in the core network 400 allows the core network 400 to configure what is called the SDN.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication monitoring system comprising:
   a first base station device having a first service area;
   a second base station device having a second service area being included in the first service area and smaller than the first service area;
   a terminal device configured to perform a first radio communication with the first base station device when the terminal device is located in the first service area, and a second radio communication with the second base station device when the terminal device is located in the second service area; and a monitoring device configured to:

receive first observation data acquired from the first radio communication, from the first base station device, receive second observation data acquired from the second radio communication, from the second base station device, and estimate a cause for the first observation data and the second observation data being obtained, based on the first observation data and the second observation data.

2. The communication monitoring system according to claim 1, wherein the cause is estimated based on a relation between the cause and a ratio of the first observation data and the second observation data.

3. The communication monitoring system according to claim 1, wherein the cause $\theta_t$ is estimated based on an expression below $$\theta_t = (Y_t - v_t)/F_t$$

where $Y_t$ represents the first observation data and the second observation data acquired in an observation time t, $v_t$ represents an observation error, and $F_t$ represents a ratio of the first observation data and the second observation data $Y_t$ related to the cause $\theta_t$.

4. The communication monitoring system according to claim 1, wherein the cause is estimated based on a first comparison result obtained by comparing the first observation data and a first threshold corresponding to the first observation data, and a second comparison result obtained by comparing the second observation data and a second threshold corresponding to the second observation data.

5. The communication monitoring system according to claim 4, wherein each correspondence relation between each first comparison results and each second comparison results and each cause is stored in the monitoring device, and the cause is estimated by reading out the cause corresponding to the first comparison result and the second comparison result from each correspondence elation.

6. The communication monitoring system according to claim 1, wherein a plurality of first causes are detected for the first observation data and the second observation data acquired in an observation time t, and a plurality of second causes are detected for the first observation data and the second observation data acquired in an observation time (t−1), and the processor is configure to extract a cause that is included in the plurality of first causes and is not included in the plurality of second causes, to be the estimated cause.

7. The communication monitoring system according to claim 1, wherein the monitoring device is configured to control transmission or reception of data in the first base station device or the second base station device in accordance with the estimated cause.

8. The communication monitoring system according to claim 1, further comprising:

a communication control device configured to control transmission or reception of data for the first base station device or the second base station device, wherein the monitoring device is configured to instruct the communication control device to control transmission or reception of the data for the first base station device or the second base station device.

9. The communication monitoring system according to claim 1, further comprising:

a relay device configured to relay data transmitted from or to the first base station device or the second base station device, wherein the monitoring device is configured to instruct the relay device to control relaying of the data from or to the first base station device or the second base station device.

10. The communication monitoring system according to claim 1, wherein the monitoring device includes a display for displaying the estimated cause.

11. A communication monitoring method comprising:

receiving first observation data acquired from a first radio communication between a terminal device and a first base station device when the terminal device is located in a first service area, from the first base station device;

receiving second observation data acquired from a second radio communication between the terminal device and a second base station device when the terminal device is located in a second service area being included in the first service area and smaller than the first service area, from the second base station device; and estimating a cause for the first observation data and the second observation data being obtained, based on the first observation data and the second observation data.

12. A communication monitoring device comprising:

a memory; and a processor coupled to the memory and configured to:

receive first observation data acquired from a first radio communication between a terminal device and a first base station device when the terminal device is located in a first service area, from the first base station device, receive second observation data acquired from a second radio communication between the terminal device and a second base station device when the terminal device is located in a second service area being included in the first service area and smaller than the first service area, from the second base station device, and estimate a cause for the first observation data and the second observation data being obtained, based on the first observation data and the second observation data.

* * * * *